(12) United States Patent
Gardner, Jr.

(10) Patent No.: US 6,265,705 B1
(45) Date of Patent: Jul. 24, 2001

(54) ALIGNMENT APPARATUS AND METHOD FOR AN IMAGING SYSTEM

(75) Inventor: Richard Lynn Gardner, Jr., Greeley, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/290,216

(22) Filed: Apr. 13, 1999

(51) Int. Cl.$^7$ .................................................. H01J 40/14
(52) U.S. Cl. ....................... 250/208.1; 250/566; 250/239; 358/474
(58) Field of Search ................................. 250/214.1, 216, 250/208.1, 566, 239; 235/462; 358/474, 493, 494

(56) References Cited

U.S. PATENT DOCUMENTS

| | | | |
|---|---|---|---|
| 2,880,267 | 3/1959 | Goldmark et al. | 178/5.4 |
| 4,709,144 | 11/1987 | Vincent | 250/226 |
| 4,753,908 | 6/1988 | Kawase et al. | 502/63 |
| 4,806,750 | 2/1989 | Vincent | 250/226 |
| 4,855,818 | 8/1989 | Morimoto et al. | 358/75 |
| 4,870,268 | 9/1989 | Vincent et al. | 250/226 |
| 4,926,041 | 5/1990 | Boyd | 250/226 |
| 5,018,808 | 5/1991 | Meyers et al. | 350/6.91 |
| 5,019,703 | 5/1991 | Boyd et al. | 250/208.1 |
| 5,032,004 | 7/1991 | Steinle | 350/171 |
| 5,040,872 | 8/1991 | Steinle | 359/638 |
| 5,044,727 | 9/1991 | Steinle | 350/171 |
| 5,122,911 | 6/1992 | Kuo | 359/889 |
| 5,151,887 | 9/1992 | Miyazaki | 369/44.32 |
| 5,227,620 | 7/1993 | Elder, Jr. et al. | 250/208 |
| 5,241,174 | 8/1993 | Ando | 250/235 |
| 5,315,111 | 5/1994 | Burns et al. | 250/235 |
| 5,373,437 | 12/1994 | Itoh et al. | 364/44.32 |
| 5,387,789 | 2/1995 | Ota | 250/201.7 |
| 5,410,347 | 4/1995 | Steinle et al. | 348/270 |
| 5,646,394 | 7/1997 | Steinle et al. | 250/208.1 |

FOREIGN PATENT DOCUMENTS

| | | | |
|---|---|---|---|
| 1-147956 | 6/1989 | (JP) | H04N/1/04 |
| 2-277374 | 11/1990 | (JP) | H04N/1/06 |
| 4-81068 | 3/1992 | (JP) | H04N/1/04 |

Primary Examiner—Stephone B. Allen

(57) ABSTRACT

Disclosed herein is an improved imaging system of the type having a photosensor package and at least one optical component, e.g, a lens, mounted within an optical assembly housing. The photosensor package may be mounted to a substrate, such as a printed circuit board, in a conventional manner. The substrate, however, may be formed having a shorter length than the photosensor package. This shorter length causes the ends of the photosensor package to extend beyond the substrate and, thus, be exposed. The exposed ends of the photosensor package, in turn, allow the photosensor package to be directly referenced to reference surfaces formed on the optical assembly housing.

23 Claims, 18 Drawing Sheets

ALIGNMENT APPARATUS AND METHOD FOR AN IMAGING SYSTEM

FIELD OF THE INVENTION

The present invention relates generally to an imaging system and, more specifically, to an imaging system of the type having at least one optical component in alignment with a photosensor device.

BACKGROUND OF THE INVENTION

Imaging devices are used to produce machine-readable data which is representative of the image of an object, e.g. a page of printed text. One type of imaging device is a photoelectric imaging device. As used herein, the phrase "photoelectric imaging device" means any device which generates data representative of an imaged object through use of a photosensor array such as a charge coupled device (CCD). Photoelectric imaging devices include devices such as camcorders and digital cameras which instantaneously focus an entire image which is to be captured onto a two dimensional photosensor array. Photoelectric imaging devices also include line-focus systems.

Some line focus systems image an object by sequentially focusing narrow "scan line" portions of the object onto a linear photosensor array by sweeping a scanning head over the object. Such devices, commonly referred to as optical scanners include computer input devices usually referred to simply as "scanners" as well as facsimile machines and digital copy machines.

A line focus system is also used in some barcode readers. Generally, in line focus barcode readers, a narrow portion of a barcode is imaged onto a linear photosensor array. Electrical output from the photosensor array may then be analyzed to read the imaged barcode.

In a line-focus system, a light beam from an illuminated line object is imaged by a lens onto a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as "pixels") produces a data signal which is representative of the light intensity that it experiences during an immediately preceding interval of time known as a sampling interval. All of the photoelement data signals are received and processed by an appropriate data processing system.

In a color optical scanner, a plurality of spectrally separated imaging beams (typically red, green and blue beams) must be projected onto a photosensor array or arrays. The construction and operation of color optical scanners is fully disclosed in the following United States patents: U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER (and corresponding EPO patent application no. 90306876.5 filed Jun. 22, 1990); U.S. Pat. No. 5,019,703 of Boyd et al. for OPTICAL SCANNER WITH MIRROR MOUNTED OCCLUDING APERTURE OR FILTER (and corresponding EPO patent application no. 90312893.2 filed Nov. 27, 1990); U.S. Pat. No. 5,032,004 of Steinle for BEAM SPLITTER APPARATUS WITH ADJUSTABLE IMAGE FOCUS AND REGISTRATION (and corresponding EPO patent application no. 91304185.1 filed May 9, 1991); U.S. Pat. No. 5,044,727 of Steinle for BEAM SPLITTER/COMBINER APPARATUS (and corresponding EPO patent application no. 91303860.3 filed Apr. 29, 1991); U.S. Pat. No. 5,040,872 of Steinle for BEAM SPLITTER/COMBINER WITH PATH LENGTH COMPENSATOR (and corresponding EPO patent application no. 90124279.2 filed Dec. 14, 1990 which has been abandoned); U.S. Pat. No. 5,227,620 of Elder, Jr. et al. for APPARATUS FOR ASSEMBLING COMPONENTS OF COLOR OPTICAL SCANNERS (and corresponding EPO patent application no. 91304403.8 file May 16, 1991) and U.S. Pat. No. 5,410,347 of Steinle et al. for COLOR OPTICAL SCANNER WITH IMAGE REGISTRATION HOLDING ASSEMBLY, which are all hereby specifically incorporated by reference for all that is disclosed therein.

In imaging devices and particularly the line-focus system described above, it is imperative for accurate imaging that the light beam from the object be accurately aligned with the photosensor array. In a typical line focus scanning device, before reaching the photosensor array, the imaging light beam is transmitted by one or more optical components, e.g., a lens. Even a slight misalignment between any of these optical components and the photosensor array can cause a serious mis-alignment between the beam and the photosensor array and result in a corresponding degradation in imaging quality.

Scanning devices that include light beam alignment features are fully described in U.S. Pat. No. 5,646,394 of Steinle et al. for IMAGING DEVICE WITH BEAM STEERING CAPABILITY and in U.S. patent application Ser. No. 09/121,793 filed on Jul. 23, 1998, of Christensen for PHOTOELECTRIC IMAGING METHOD AND APPARATUS, which are both hereby specifically incorporated by reference for all that is disclosed therein.

Typically, the optical components in an imaging device are mounted within an imaging device housing. The photosensor array is typically mounted to a circuit board, which, in turn, is mounted to the imaging device housing. It has been found, however, that it is difficult to accurately locate a photosensor array on its underlying circuit board. Thus, although the circuit board may be accurately aligned to the imaging device housing, the inaccuracy in location between the photosensor array and the circuit board often results in misalignment between the photosensor array and the remainder of the imaging device, e.g., the lens. As pointed out above, such misalignment can cause a serious misalignment between the beam and the photosensor array and result in a corresponding degradation in imaging quality.

To address this misalignment problem, it is conventional, when manufacturing an imaging device, to carefully align the photosensor array. This alignment procedure may be performed, for example, by placing the imaging device in a test fixture, imaging a test target with the imaging device and monitoring the output from photosensor array to determine the degree of misalignment of the photosensor array. Once the degree of misalignment has been determined, the photosensor array may be physically aligned with the remainder of the optical device, e.g., by moving the photosensor array circuit board relative to the remainder of the optical device housing. An example of an alignment procedure and mechanism used in a scanning device is fully disclosed in U.S. Pat. No. 4,753,908 of Christensen for PHOTOELECTRIC IMAGING DEVICE PHOTOSENSOR ARRAY ALIGNMENT APPARATUS AND METHOD, which is hereby specifically incorporated by reference for all that is disclosed therein.

Although the alignment procedure described above is generally effective in aligning a photosensor array, it is time consuming and generally labor intensive, thus adding to the complexity and cost involved in the manufacture of imaging devices.

Accordingly, it would be desirable to provide an optical imaging device which provides for accurate alignment between a photosensor array and the other optical components in the device.

SUMMARY OF THE INVENTION

Disclosed herein is an improved imaging system of the type having a photosensor package and at least one optical component, e.g, a lens, mounted within an optical assembly housing. The photosensor package may be mounted to a substrate, such as a printed circuit board, in a conventional manner. The substrate, however, may be formed having a shorter length than the photosensor package. This shorter length allows the ends of the photosensor package to extend beyond the substrate and, thus, be exposed. The exposed ends of the photosensor package, in turn, may be directly referenced to the optical assembly housing. As can be appreciated, directly mounting the photosensor package to the housing in this manner makes alignment between the photosensor package the substrate non critical. This mounting arrangement also allows the photosensor package to be precisely located by reference surfaces formed on the optical assembly housing. The reference surfaces, thus, eliminate the need to align the photosensor package with the optical components of the optical assembly housing after assembly.

The optical assembly housing may include an integral spring member to apply force to the photosensor package and, thus, ensure that the photosensor package remains in tight contact with the optical assembly housing reference surfaces. The optical assembly housing may also include additional reference surfaces in order to orient the photosensor package with respect to all degrees of movement.

The imaging system is designed such that the photosensor package may easily be installed within the optical device housing without the need for tools.

DETAILED DESCRIPTION OF THE INVENTION

Figure 1:
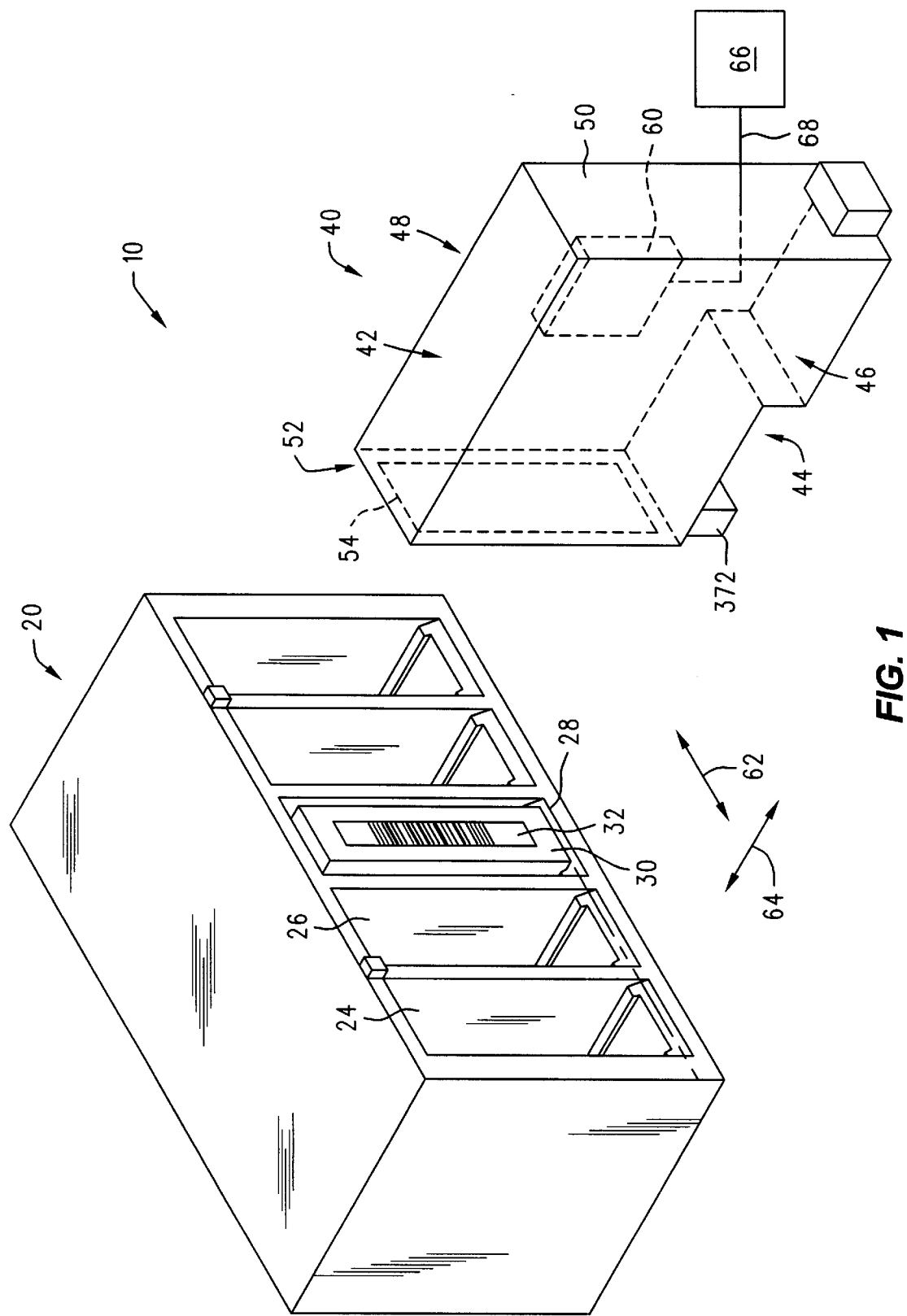
FIG. 1 is a perspective view of a media library device including a media handling device and a media magazine.

FIGS. 1–23 generally illustrate an imaging apparatus 60 for producing machine-readable data representative of an imaged object 32. The imaging apparatus may include an imaging apparatus housing 200. The imaging apparatus housing 200 may include at least one imaging apparatus housing first reference surface 442, 446 and at least one imaging apparatus housing second reference surface 274, 276. The imaging apparatus 60 may further include a photosensor assembly 500 which may include a plurality of photosensor elements and a photosensor housing 510 substantially enclosing the plurality of photosensor elements. The photosensor housing 510 may include at least one photosensor housing first reference surface 520. The imaging apparatus 60 may further include at least one optical component 570 located within the imaging apparatus housing 200. The photosensor housing first reference surface 520 may be contact with the imaging apparatus housing first reference surface 442, 446 and the optical component 570 may be in contact with the imaging apparatus housing second reference surface 274, 276.

Figure 2:
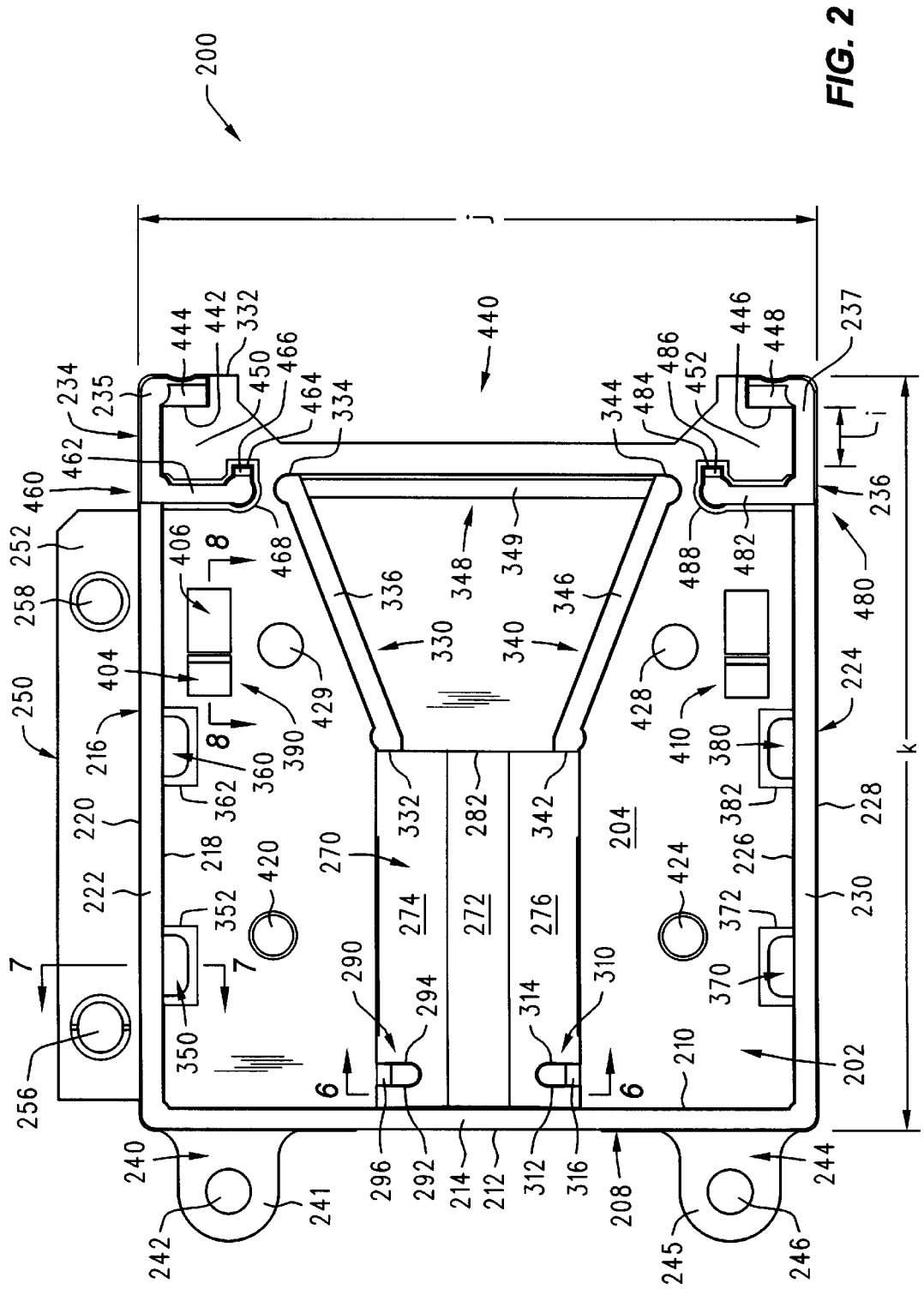
FIG. 2 is a top plan view of an imaging device housing which forms a part of the media handling device of FIG. 1.
Figure 3:
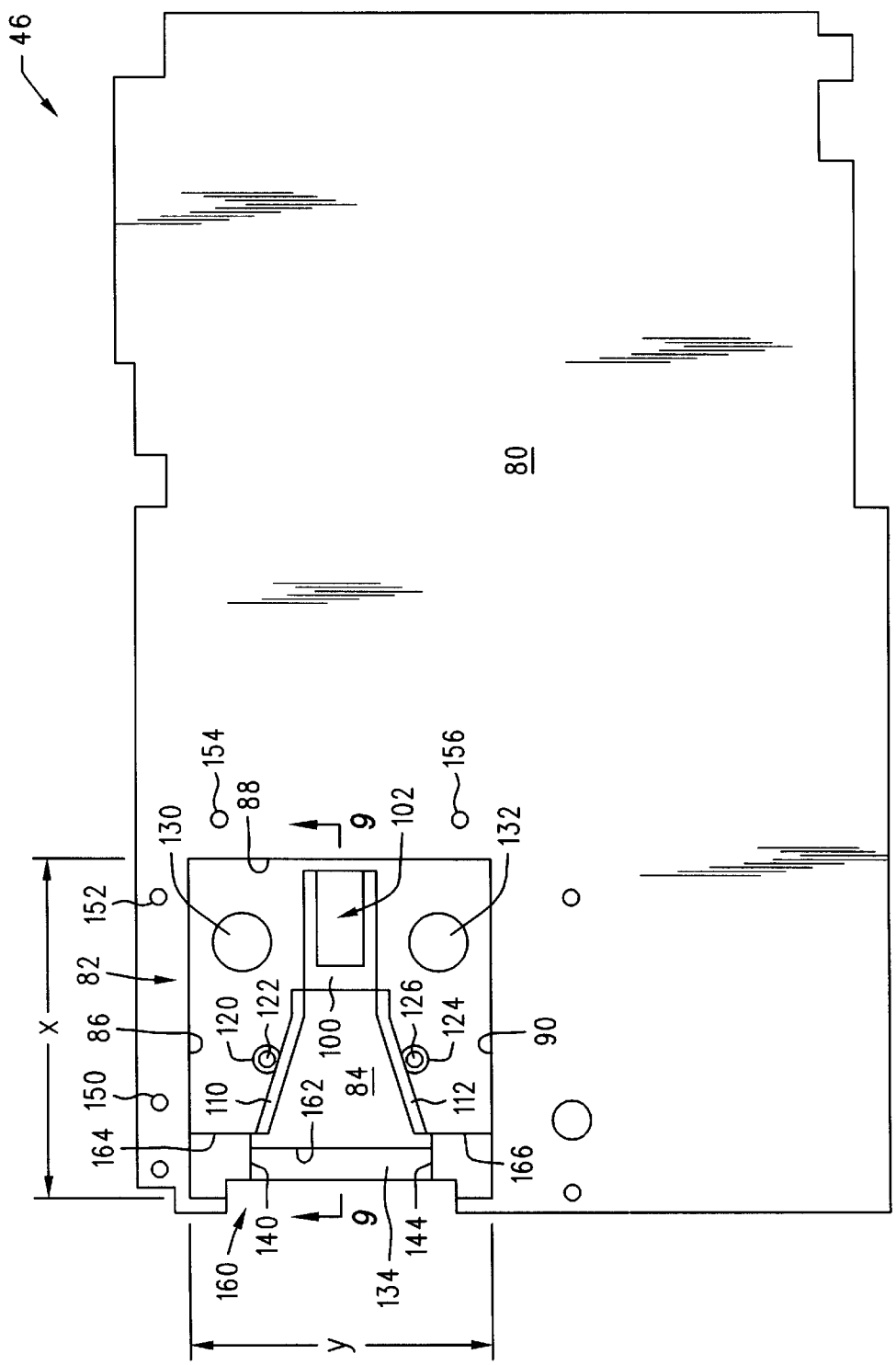
FIG. 3 is a side elevation view of a sidewall portion of the media handling device of FIG. 1.

FIGS. 1–3 further illustrate, in general, a method of assembling an imaging apparatus 60 for producing machine-readable data representative of an imaged object 32. The method includes providing an imaging apparatus housing 200, the imaging apparatus housing including at least one imaging apparatus housing first reference surface 442, 446 and at least one imaging apparatus housing second reference surface 274, 276. The method further includes providing a photosensor assembly 500, the photosensor assembly 500 including a plurality of photosensor elements and a photosensor housing 510 substantially enclosing the plurality of photosensor elements. The photosensor housing 510 may include at least one photosensor housing first reference surface 520. The method further includes aligning at least one optical component 570 with the imaging apparatus housing 200 by contacting the optical component 570 with the imaging apparatus housing second reference surface 274, 276 and aligning the photosensor housing 510 with the imaging apparatus housing 200 by contacting the photosensor housing first reference surface 520 with the imaging apparatus housing first reference surface 442, 446.

FIGS. 1–23 further illustrate, in general, an imaging apparatus 60 for producing machine-readable data representative of an imaged object 32. The imaging apparatus 60 includes an imaging apparatus housing 200; at least one optical component 570 housed within the imaging apparatus housing 200 and a photosensor assembly 500 attached to the imaging apparatus housing 200. The photosensor assembly 500 may have a photosensor assembly axis associated therewith. The photosensor assembly 500 may include a substrate 540; a photosensor housing 510 attached to the substrate 540 and a plurality of photosensor elements housed within the photosensor housing 510. The photosensor housing 510 may have a photosensor housing length "p" measured in a direction parallel to the photosensor assembly axis and the substrate 540 may have a substrate length "q" measured in a direction parallel to the photosensor assembly axis. The photosensor housing length "p" is greater than the substrate length "q".

Having thus described the apparatus and method in general, they will now be described in further detail.

FIG. 1 schematically illustrates a media library device 10. Media library device 10 may include at least one media magazine 20 and at least one media handling device 40. Magazine 20 may include a plurality of slots 22, such as the individual slots 24, 26, 28. The slots 22 may be adapted to receive media storage devices, such as the media storage device 30 shown housed within the slot 28 in FIG. 1. Media storage device 30 may be any type of media storage device. Media storage device 30 may, for example, be a conventional digital linear tape cartridge. Media storage device 30 may include a bar code label 32 affixed thereto for the purpose of uniquely identifying the media storage device 30.

Media handling device 40 may be in the form of a generally parallelepiped structure having a top wall 42, an oppositely disposed bottom wall 44, a left sidewall 46 and an oppositely disposed right sidewall 48, a rear wall 50 and an oppositely disposed front wall 52. Front wall 52 may include a generally rectangular opening 54 therein. An imaging device 60 which may, for example, be a barcode reader, may be attached to the inside surface of the media handler left sidewall 46 as shown. Imaging device 60 may be attached to a computer processor 66 via a data connection 68.

In operation, the media handling device 40 is moveable in a transverse direction 62 relative to the media magazine 20. In this manner, the media handling device 40 may be selectively positioned adjacent any of the slots 22 of the media magazine 20. A plunger mechanism, not shown, located within the media handling device 40 is moveable in a plunge direction 64 and is adapted to selectively engage a media storage device, such as the media storage device 30. In this manner, the media handling device 40 is able to move media storage devices between the media magazine 20 and one or more media playing/recording devices, not shown, located within the media library device 10. The imaging device 60 may serve to read barcode labels on the media storage devices, such as the barcode label 32 on the media storage device 30, in order to determine the identity of a specific media storage device.

Media library device 10 may be a conventional media library device and may, for example, be of the type disclosed in the following U.S. patent applications: Ser. No. 09/290,842 of Gardner for OPTICAL ASSEMBLY HAVING LENS OFFSET FROM OPTICAL AXIS, filed on the same date as this application (attorney docket number 10971597-1); Ser. No. 09/291,242 of Gardner et al. for GUIDANCE SYSTEM AND METHOD FOR AN AUTOMATED MEDIA EXCHANGER, filed on the same date as this application (attorney docket number 10971595-1); Ser. No. 09/290,429 of Gardner et al. for IMAGING APPARATUS ALIGNMENT SYSTEM AND METHOD, filed on the same date as this application (attorney docket number 10971594-1); Ser. No. 09/290,807 of Gardner for CALIBRATION SYSTEM FOR AN IMAGING APPARATUS AND METHOD, filed on the same date as this application (attorney docket number 10971593-1); Ser. No. 09/290,428 of Kato et al. for METHOD OF DECIPHERING BAR CODES, filed on the same date as this application (attorney docket number 10970585-1); Ser. No. 09/290,926 of Gardner, et al. for AUTOMATED OPTICAL DETECTION SYSTEM AND METHOD, filed on the same date as this application (attorney docket number 10971596-1); Ser. No. 09/292,781 of Gardner for LOW POWER ILLUMINATOR, filed on the same date as this application (attorney docket number 10982311-1); and Ser. No. 09/290,949 of Gardner for METHOD AND APPARATUS FOR SETTING FOCUS IN AN IMAGING DEVICE, filed on the same date as this application (attorney docket number 10982313-1), which are all hereby incorporated by reference for all that is disclosed therein.

Imaging device 60 may be housed within a two-part enclosure. One part of this enclosure may be formed by a housing 200, e.g., FIG. 2. The second part of the two-part enclosure may be formed by a portion of the inner surface 80, FIG. 3, of the media handling device left sidewall 46.

The imaging device enclosure will be now be described in further detail. With reference first to FIG. 2, the imaging device enclosure housing 200 may be an integrally formed, generally parallelepiped-shaped structure. Housing 200 may include a front wall member 208 having inner and outer surfaces 210, 212, respectively, and a left-facing edge surface 214 extending between the surfaces 210, 212. Housing 200 may further include a top wall member 216 having inner and outer surfaces 218, 220, respectively, and a left-facing edge surface 222 extending between the surfaces 218, 220. Housing 200 may further include a bottom wall member 224 having inner and outer surfaces 226, 228, respectively, and a left-facing edge surface 230 extending between the surfaces 226, 228. Housing 200 may also include a right sidewall member 202 having an inner surface 204 and an outer surface 206, FIG. 4. Housing 200 may terminate in a rear edge 232 as shown in FIG. 2. Right sidewall 202 may generally extend between the previously described wall members 208, 216 and 224 as shown in FIG. 2. It is noted that directional terms, such as "right", "left", "front", "top" and "bottom", used in conjunction with the housing 200, are used in a manner consistent with the usage of these terms with reference to FIG. 1.

The housing 200 may have a height "j" extending between the top wall member outer surface 220 and the bottom wall member outer surface 228, and a width "k" extending between the front wall member outer surface 212 and the rear edge 232. The height "j" may for example be about 47 mm. The width "k" may, for example, be about 53 mm.

Referring again to FIG. 2, a pair of flanges 240, 244 may extend forwardly from the front wall member 208, as shown. The flange 240 may include a left facing surface 241 and an oppositely disposed right facing surface, not shown. The flange 240 may include a through-hole 242 extending from the left facing surface 241 to the right facing surface of the flange 240. In a similar manner, the flange 244 may include a left facing surface 245 and an oppositely disposed right facing surface, not shown. The flange 244 may include a through-hole 246 extending from the left facing surface 245 to the right facing surface of the flange 244.

Figure 4:
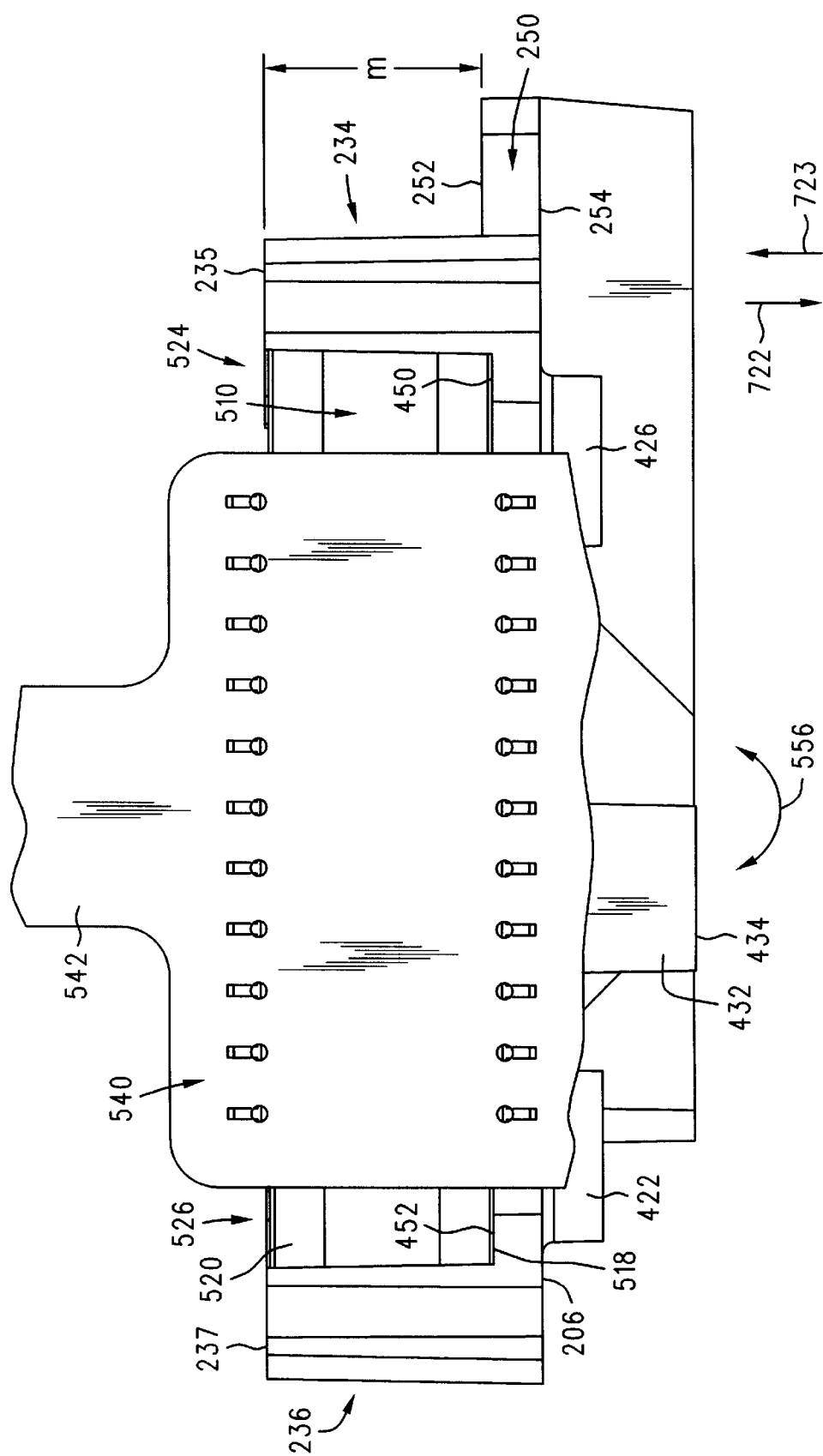
FIG. 4 is a rear elevation view of the imaging device housing of FIG. 2 with a photosensor assembly installed.

A flange 250 may extend upwardly from the top wall member 216 as illustrated in FIGS. 2 and 4. Flange 250 may have a left facing surface 252 and a right facing surface 254. A pair of holes 256, 258, FIG. 2, may extend through the flange 250 and, thus, extend between the surfaces 252 and 254. A distance "L", FIG. 7, may extend between the left facing surface 252 of the flange 250 and the left facing edges 214, 222 and 230 of the wall members 208, 216 and 224, respectively. This same distance "L" may extend between the left facing surfaces 241, 245 of the flanges 240, 244, previously described, and the left facing edges 214, 222 and 230 of the wall members 208, 216 and 224, respectively. The distance "L" may, for example, be about 5 mm.

Figure 5:
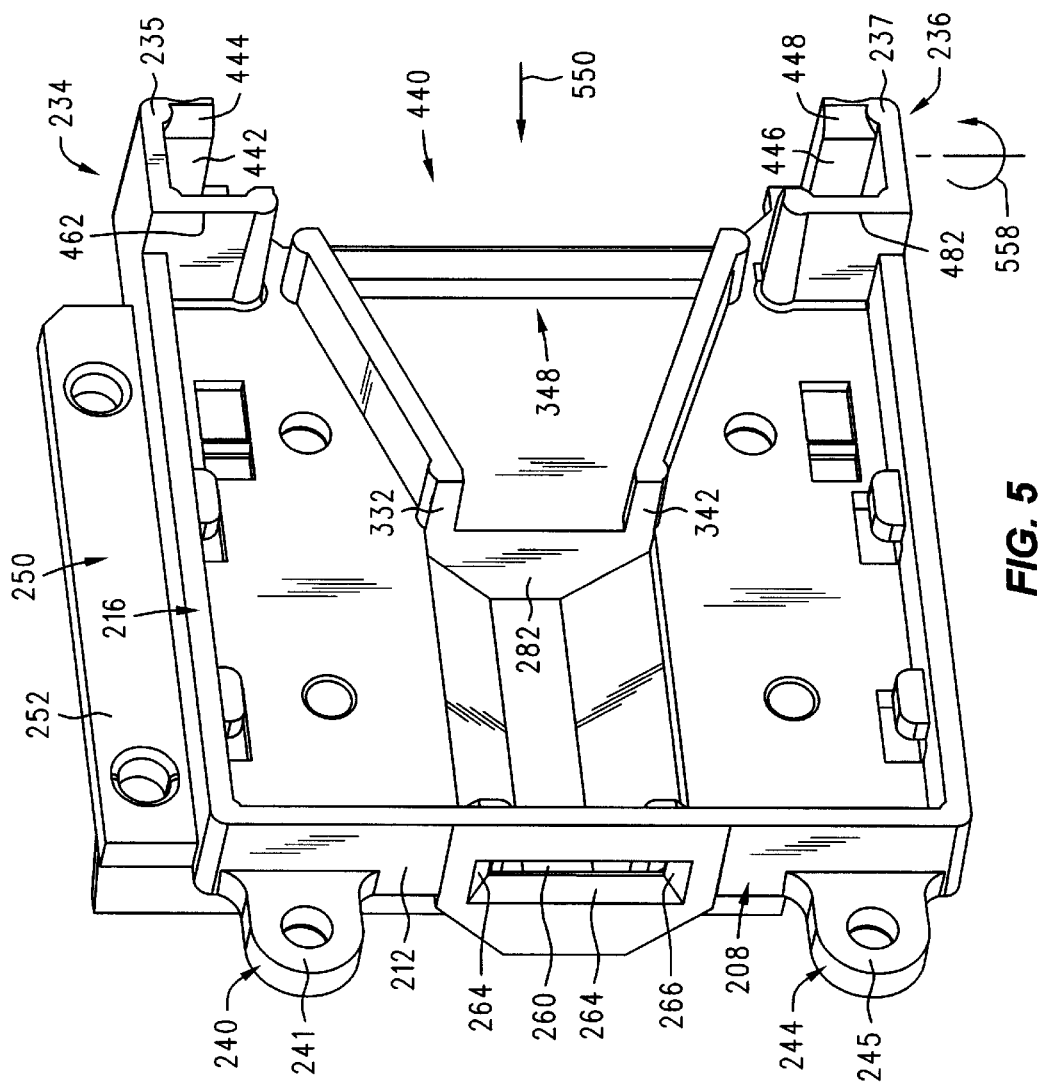
FIG. 5 is top perspective view of the imaging device housing of FIG. 2.

Referring to FIG. 5, front wall member 208 may include a generally rectangular opening 260 therethrough. The opening 260 may intersect the front wall member outer surface 212 via a plurality of beveled surfaces, such as the surfaces 262, 264, 266. These beveled surfaces tend to reduce specular reflection when light passes through the opening 260. The beveled surfaces also result in the wall member 208 having a reduced thickness adjacent the opening 260. This reduced thickness, in turn, tends to reduce vignetting—an effect in which the effective f-stop of an optical system is reduced.

Figure 6:
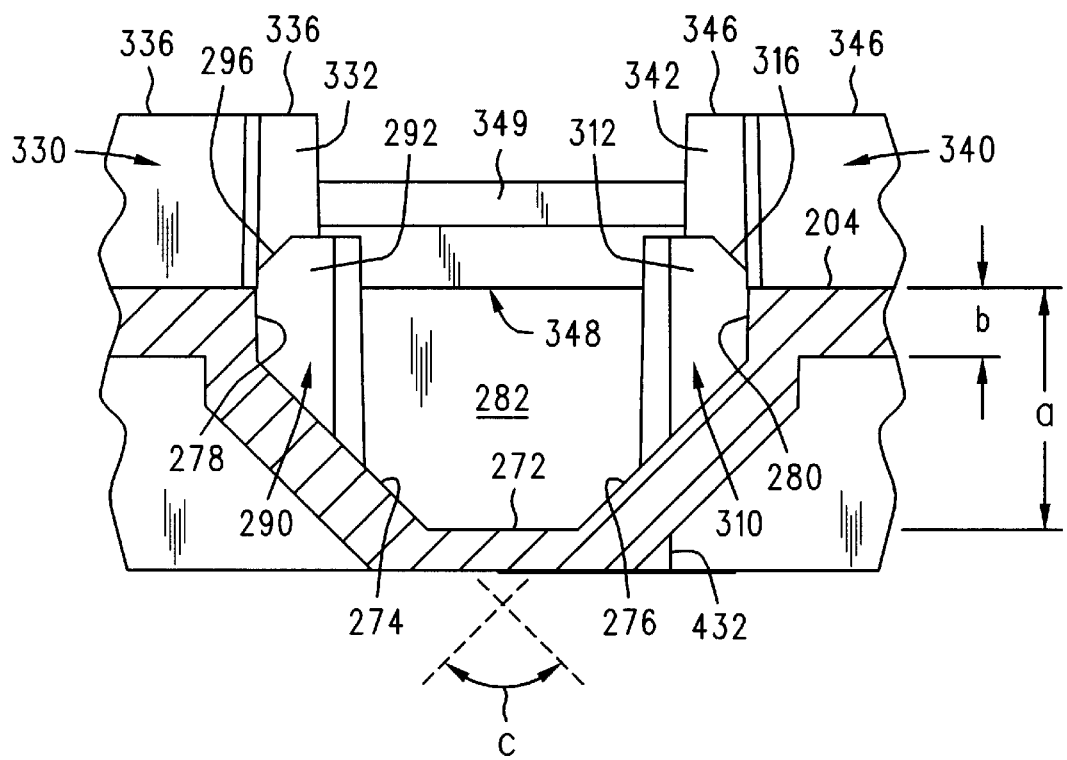
FIG. 6 is cross-sectional view taken along the line 6—6 in FIG. 2.

Referring again to FIG. 2, a lens locating mechanism 270 may be provided in the right sidewall member 202. Specifically, the lens locating mechanism 270 may include two angled reference surfaces 274, 276 which may be connected by a flat surface 272. FIG. 6 illustrates the lens locating mechanism 270 in a cross-sectional view taken along the line 6—6 in FIG. 2. Referring to FIG. 6, flat surface 272 may be substantially parallel to the right sidewall member inner surface 204 and may be located a distance "a" of about 7 mm therefrom. Referring again to FIG. 6, the angled surfaces 274, 276 may be connected to the right sidewall member inner surface 204 via a pair of sidewall portions 278, 280, respectively. Sidewall portions 278, 280 may be substantially perpendicular to the right sidewall member inner surface 204 and may extend for a length "b" of about 2 mm therefrom, as shown. The surfaces 274, 276 may form an included angle "c" of about 90 degrees, as shown in FIG. 6. Lens locating mechanism 270 may include a rear surface 282 which may be substantially perpendicular to the right sidewall member inner surface 204.

Referring to FIGS. 2 and 6, a pair of stop members 290, 310 may be provided within the lens locating mechanism 270. Specifically, the stop member 290 may be attached to the sidewall portion 278 and a portion of the angled reference surface 274, as best shown in FIG. 6. Referring to FIG. 2, stop member 290 may include a forwardly facing surface 292 and a rearwardly facing surface 294. Stop member 290 may further include a tapered edge 296 which extends above the right sidewall member inner surface 204. In a similar manner, the stop member 310 may be attached to the sidewall portion 280 and a portion of the angled reference surface 276, as best shown in FIG. 6. Referring to FIG. 2, stop member 310 may include a forwardly facing surface 312 and a rearwardly facing surface 314. Stop member 310 may further include a tapered edge 316 which extends above the right sidewall member inner surface 204.

With reference to FIG. 2, a pair of light guide wall members 330, 340 may extend from the right sidewall member inner surface 204 as shown. Wall member 330 may include a forwardly facing surface 332, a rearwardly facing surface 334 and a left facing surface 336, as shown. In a similar manner, wall member 340 may include a forwardly facing surface 342, a rearwardly facing surface 344 and a left facing surface 346. The forwardly facing surfaces 332, 342 of the wall members 330, 340, respectively, may be coplanar with the lens locating mechanism rear surface 282. The wall members 330, 340 may, for example, extend the same distance from the surface 204 as the wall members 208, 216, 224, previously described. Accordingly, the distance "L", FIG. 7, may extend between the surface 204 and the surfaces 336, 346 of the wall members 330, 340, respectively.

A transverse wall member 348 may extend between rearward portions of the wall members 330, 340, as shown. A tapered portion 349 may be located at the outer edge of the transverse wall member 348. As best shown in FIG. 6, transverse wall member 348 does not extend to the top surfaces 336, 346 of the wall members 330, 340, respectively.

Referring again to FIG. 2, a pair of tabs 350, 360 may extend inwardly from the top wall member inner surface 218 and a pair of tabs 370, 380 may extend inwardly from the bottom wall member inner surface 226. A pair of openings 352, 362 may extend through the housing right sidewall member 202 in a location adjacent the tabs 350, 360, respectively. In a similar manner, a pair of openings 372, 382 may extend through the housing right sidewall member 202 in a location adjacent the tabs 370, 380, respectively.

The configuration of the tabs 350, 360, 370, 380 may be substantially identical. Accordingly, only the tab 350, and associated opening 352, will be described in detail, it being understood that this description applies equally to the tabs 360, 370, 380 and the associated openings 362, 372, 382, respectively.

Figure 7:
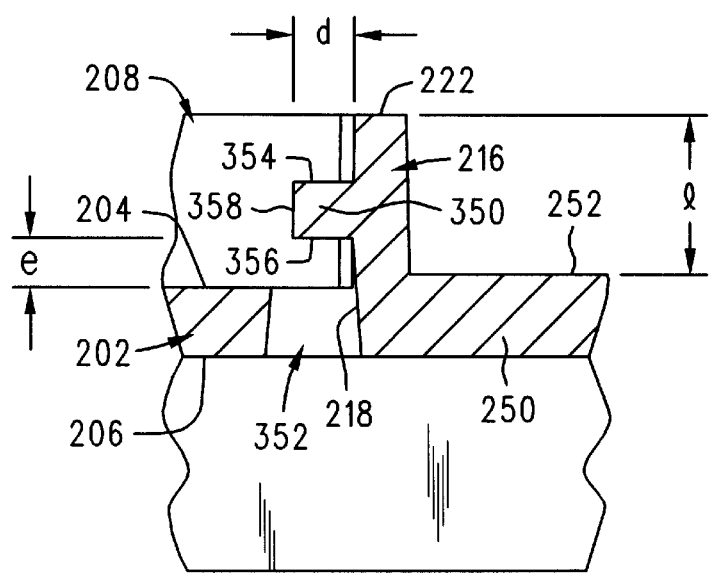
FIG. 7 is a cross-sectional view taken along the line 7—7 in FIG. 2.

Referring to FIG. 7, it can be seen that the tab 350 may have a left facing surface 354, an oppositely disposed, substantially parallel right facing surface 356 and a downwardly facing surface 358 which connects the surfaces 354 and 356 and which may be substantially perpendicular thereto. The tab 350 may extend from the top wall member 216 a distance "d" of about 1.8 mm, as measured between the top wall member inner surface 218 and the tab downwardly facing surface 358. The tab right facing surface 356 may be spaced a distance "e" of about 1.45 mm from the right sidewall member 202, as measured from the right sidewall member inner surface 204.

The opening 352 may be provided to facilitate molding of the housing 200, and particularly the tab 350. Referring to FIG. 2, it can be seen that the opening 352 may be formed so as to be slightly larger than the tab 350.

Referring again to FIG. 2, a pair of catch mechanisms 390, 410 may be provided in the right sidewall member 202, as shown. The configuration of the catch mechanisms 390, 410 may be substantially identical. Accordingly, only the catch mechanism 390 will be described in detail, it being understood that this description applies equally to the catch mechanism 410.

Figure 8:
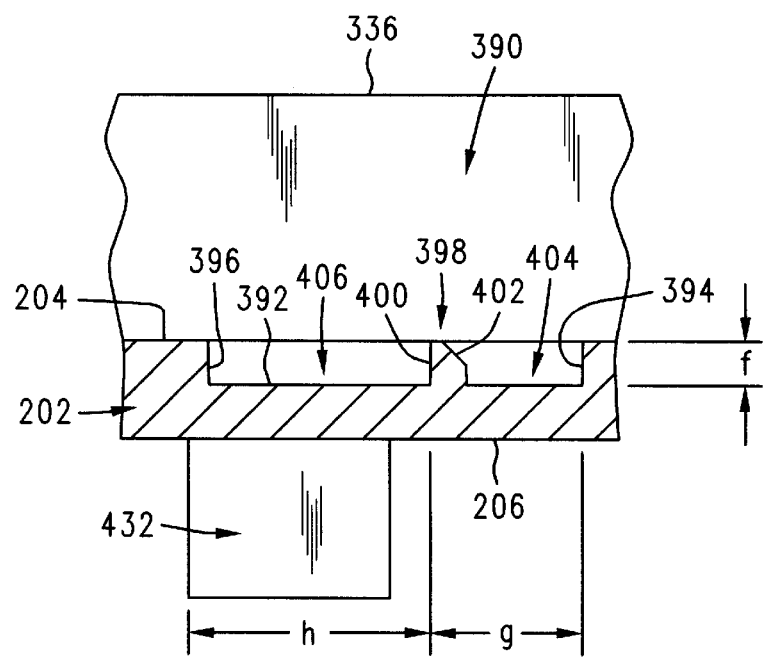
FIG. 8 is cross-sectional view taken along the line 8—8 in FIG. 2.

Referring to FIG. 8, catch mechanism 390 may generally include an indentation in the right sidewall member 202. This indentation is bounded by a lower (as viewed in FIG. 8) surface 392, a forward surface 394 and a rearward surface 396. Lower surface 392 may be located a distance "f" of about 0.9 mm from the inner surface 204 of the right sidewall member 202. A catch member 398 may extend upwardly from the catch mechanism lower surface 392. Catch member 398 may include a rearwardly facing surface 400, which may be substantially perpendicular to the catch mechanism lower surface 392 and the right sidewall member inner surface 204. Catch member 398 may also include a tapered forwardly facing surface 402 as shown. As can be appreciated, catch member 398 divides the catch mechanism into a forward compartment 404 and a rearward compartment 406. Forward compartment 404 may extend for a distance "g" of about 3 mm, as measured between the catch member rearwardly facing surface 400 and the catch mechanism forward surface 394. Rearward compartment 406 may extend for a distance "h" of about 4.5 mm, as measured between the catch member rearwardly facing surface 400 and the catch mechanism rearward surface 396.

Referring again to FIG. 2, a pair of through-holes 420, 424 may extend through the right sidewall member 202. The through-holes 420, 424 may further extend through a pair of generally cylindrical members 422, 426, respectively, FIG. 4. Cylindrical members 422, 426 may extend outwardly from the surface 206 and may serve to increase the length of the through-holes 420, 424. A second pair of through-holes 428, 429, FIG. 2, may be formed in the right sidewall member 202 and may extend between the right sidewall member inner and outer surfaces 204, 206, respectively. Referring to FIG. 4, a generally cylindrical extension member 432 may extend from the outer surface 206 as shown. Extension member 432 may include an opening therein, extending upwardly (as viewed in FIG. 4) from the edge 434 of the extension member. This opening may extend approximately to the level of the housing right sidewall member lower surface 206 and, thus, does not extend through the housing right sidewall member 202. Extension member 432, along with the hole therein, may be provided, for example, to allow auxiliary components to be attached to the housing 200.

With further reference to FIG. 2, the housing 200 may include a photosensor mounting area 440. Referring to FIGS. 2, 4 and 5, it can be seen that top wall member 216 includes an extended portion 234 in the vicinity of the photosensor mounting area 440. Extended portion 234 includes a left facing surface 235, FIG. 2. In a similar manner, bottom wall member 224 includes an extended portion 236 in the vicinity of the photosensor mounting area 440. Extended portion 236 includes a left facing surface 237, FIG. 2. The extended wall portions 234, 236 may extend for a distance "m", FIG. 4, as measured between the wall portion left facing surfaces 235, 237 and the left facing surface 252 of the flange 250. The distance "m" may, for example, be about 9 mm.

Photosensor mounting area 440 may include an upper rear reference surface 442 and a lower rear reference surface 446, FIG. 2. A tapered portion 444 may be located adjacent the upper rear reference surface 442, as illustrated in FIGS. 2 and 5. In a similar manner, a tapered portion 448 may be located adjacent the lower rear reference surface 446. Photosensor mounting area 440 may further include an upper right reference surface 450 and a lower right reference surface 452. An upper biasing member 460 may be provided as shown. Upper biasing member 460 may include leg portion 462 which extends in a cantilever fashion from the top wall member 216. Leg portion 462 may terminate in a rear facing surface 464. A tapered portion 466 may be located adjacent the rear facing surface 464, as shown. Leg portion 462 is maintained in a disconnected relationship from the housing right sidewall member 202 via an opening 468 in the sidewall member 202. The leg portion 462, thus, is only connected to the top wall member 216.

A lower biasing member 480 may be provided in a similar manner to the upper biasing member 460 described above. Specifically, lower biasing member 480 may include a leg portion 482 which extends in a cantilever fashion from the bottom wall member 224. Leg portion 482 may terminate in a rear facing surface 484. A tapered portion 486 may be located adjacent the rear facing surface 484, as shown. Leg portion 482 is maintained in a disconnected relationship from the housing right sidewall member 202 via an opening 488 in the sidewall member 202. The leg portion 482, thus, is only connected to the bottom wall member 224.

As best shown in FIG. 5, the leg portions 462, 482 may extend for substantially the same distance "m", FIG. 4, from the upper surface 252 of the flange member 250 as the left-facing surfaces 235, 237 of the extended portions 234, 236, respectively. A nominal distance "i", FIG. 2, may extend between the upper rear reference surface 442 and the rear facing surface 464 and between the lower rear reference surface 446 and the rear facing surface 484, as shown. The distance "i" may be chosen to be slightly smaller than the thickness "r", FIG. 12, of a photosensor package 500 in order to secure the photosensor package 500 within the photosensor mounting area 440 in a manner that will be described in further detail herein. The distance "i" may, for example, be about 4.2 mm when a photosensor package having a thickness "r" of about 4.4 mm is to be installed within the photosensor mounting area 440.

Figure 9:
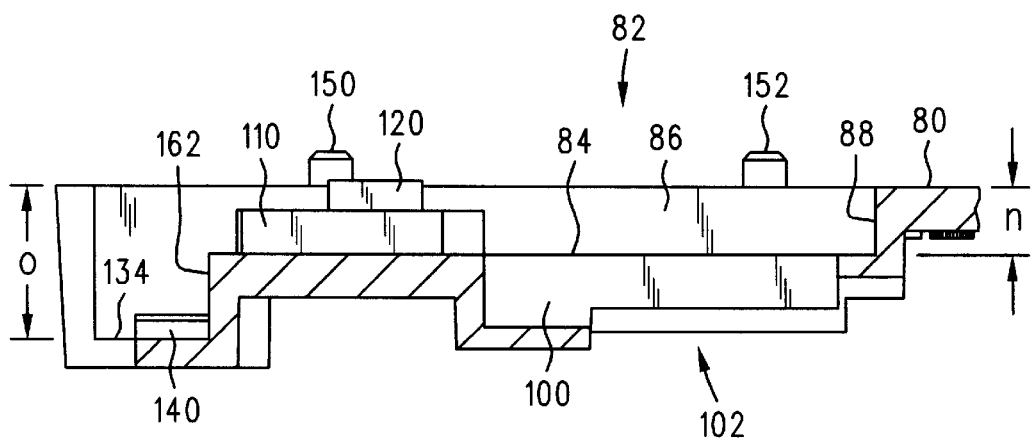
FIG. 9 is a cross-sectional view taken along the line 9—9 in FIG. 3.

FIGS. 3 and 9 illustrate the media handling device left sidewall 46. Referring to FIGS. 3 and 9, a recess 82 may be formed in the inner surface 80 of the left sidewall 46, as shown. Recess 82 may include a recessed surface 84, a top sidewall 86, a front sidewall 88 and a bottom sidewall 90 joining the recessed surface 84 to the left sidewall inner surface 80. With reference to FIG. 9, recessed surface 84 may be located a distance "n" from the surface 80. The distance "n" may, for example, be about 4.7 mm. Referring to FIG. 3, recess 82 may have a length "x" of about 54 mm and a height "y" of about 48 mm extending between the surfaces 86 and 90.

A concave (as viewed in FIG. 3) depression 100 may be formed in the recessed surface 84. Depression 100 may have the general shape of a portion of a cylinder. A generally rectangular opening 102 may be formed in the depression 100 and may extend entirely through the left sidewall member 46. A pair of wall members 110, 112 may extend rearwardly from the depression 102 as shown. A pair of generally cylindrical extensions 120, 124 may extend upwardly from the recessed surface 84. The extensions 120, 124 may include through-holes 122, 126, respectively therein. Through-holes 122, 126 may extend entirely through the left sidewall member 46. A pair of holes 130, 132 may be located in the recessed surface 84 as shown and may extend entirely through the left sidewall member 46.

A further recessed surface 134 may be provided at the rear of the recess 82, as shown. Further recessed surface 134 may be located a distance "o", FIG. 9, from the inner surface 80 of the left sidewall 46. The distance "o" may, for example, be about 11 mm. A notch 160 may be formed in the further recessed surface 134 at the rear edge of the recess 82, as shown. The notch may extend entirely through the left sidewall 46. Further recessed surface 134 may be connected to the recessed surface 84 via a transverse wall portion 162. Transverse wall portion 162 may be oriented in a substantially perpendicular manner relative to both the recessed surface 84 and the further recessed surface 134. A pair of indentations 164, 166, FIG. 3, may be formed in the transverse wall portion 162, as shown.

A pair of crush bumps 140, 144 may extend from the further recessed surface 134, as shown. A pair of pins 150, 152 may extend outwardly from the inner surface 80 of the left sidewall member 46 in a location above and adjacent the recess 82. A pair of through-holes 154, 156 may be provided in the left sidewall 46 in a location in front of and adjacent the recess 82, as shown. The through-holes 154, 156 may extend entirely through the sidewall member 46.

Figure 10:
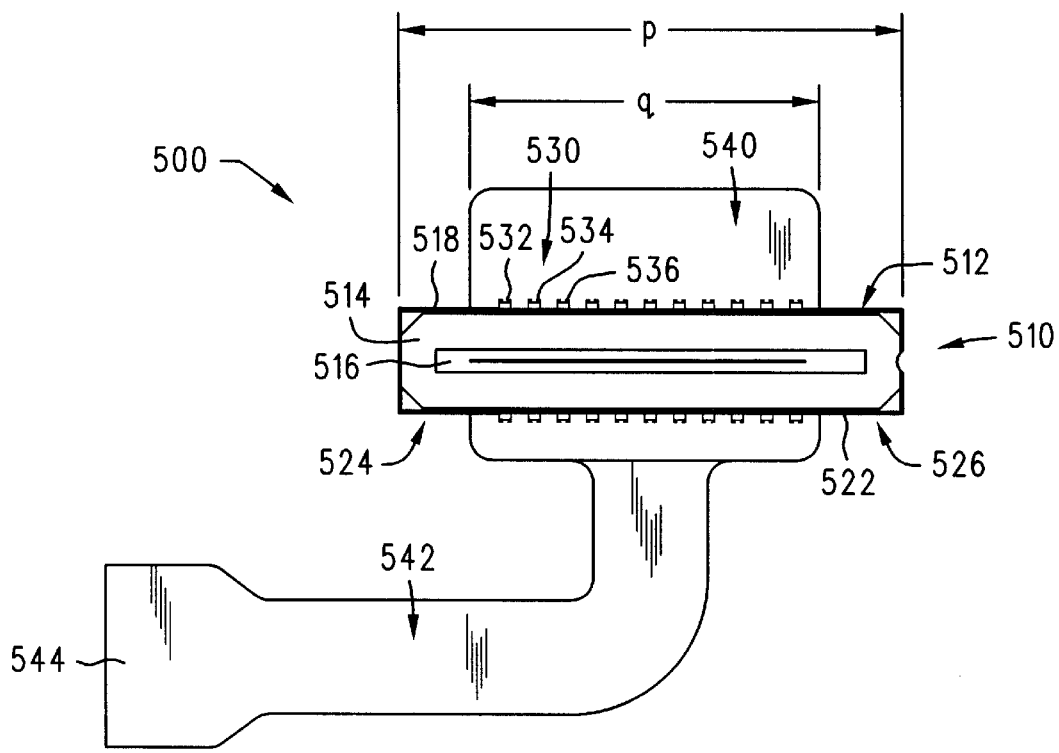
FIG. 10 is front elevation view of the photosensor assembly of FIG. 4.
Figure 11:
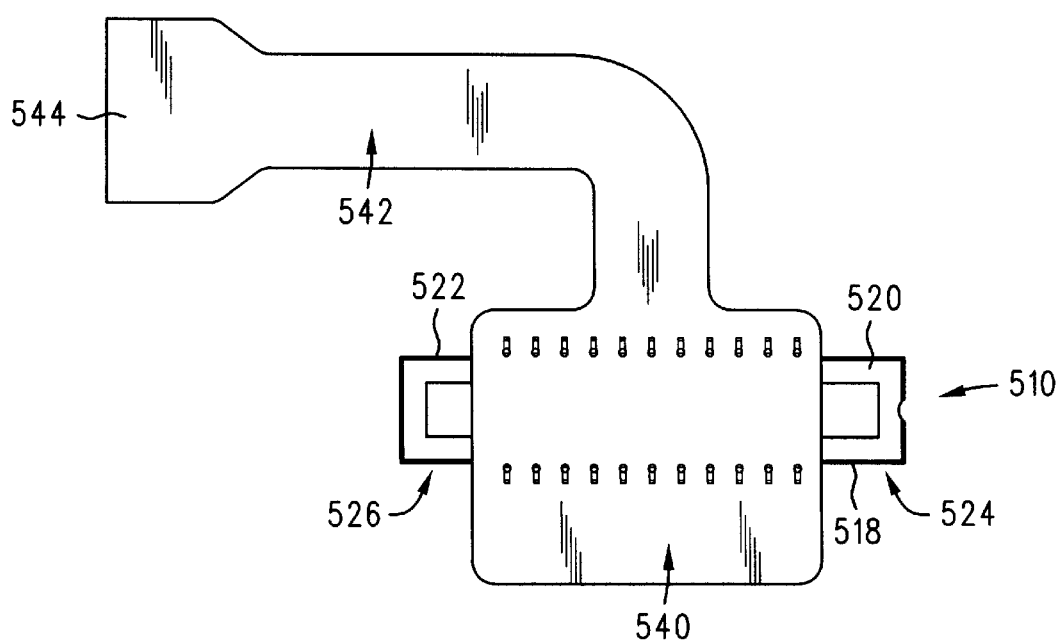
FIG. 11 is a rear elevation view of the photosensor assembly of FIG. 4.

FIGS. 10 and 11 illustrate a photosensor assembly 500. Photosensor assembly 500 may include a photosensor package 510 which may be a conventional photosensor package. Photosensor package 510 may, for example, be of the type commercially available from NEC Corporation of Japan and sold as Model No. PD3734. Photosensor package 510 may include a body portion 512. Body portion 512 includes a front surface 514, FIG. 10, a rear surface 520, FIG. 11, a bottom surface 518 and a top surface 522. Referring again to FIG. 10, front surface 514 may include a generally rectangular transparent window area 516 which allows light to enter the body portion 512 and impinge upon at least one array of photosensor elements housed therewithin. A plurality of electrical connectors 530, such as the individual electrical connectors 532, 534, 536, may extend from the photosensor package body portion 512 in a conventional manner. Body portion 512 may have a length "p" of about 44 mm and a thickness "r", FIG. 12, of about 4.4 mm.

Photosensor assembly 500 may further include a substrate 540. A flexible electrical ribbon connector 542 may be attached to the substrate 540 and may terminate in a terminal connector 544. Substrate 540 and connector 542, including terminal connector 544, may, for example, be formed as a one-piece unit. Substrate 540 may be a conventional rigid pc board. More preferably, however, substrate 540 may be a flexible substrate. The photosensor package electrical connectors 530 may be electrically connected to the substrate 540 via any conventional electrical connection mechanism, e.g., via soldering. Substrate 540 may have a length "q" which is chosen to be less than the length "p" of the body portion. The length "q" may, for example, be about 29 mm.

Forming the substrate 540 and connector 542 as a one-piece unit is advantageous in that a connection between the substrate 540 and the connector 542 is eliminated. This, in turn, eliminates one potential place where problems may arise, e.g. due to a faulty connection between the connector 542 and substrate 540.

As can be appreciated with reference to FIGS. 10 and 11, choosing the length "q" of the substrate 540 to be less than the length "p" of the photosensor package body portion 512, causes the end portions 524, 526 of the photosensor package body portion 512 to extend beyond the substrate 540 and, thus be exposed relative to the substrate 540. The exposed ends 524, 526 allow the photosensor package 510 to be mounted directly to the housing 200 as will now be described in detail.

Figure 12:
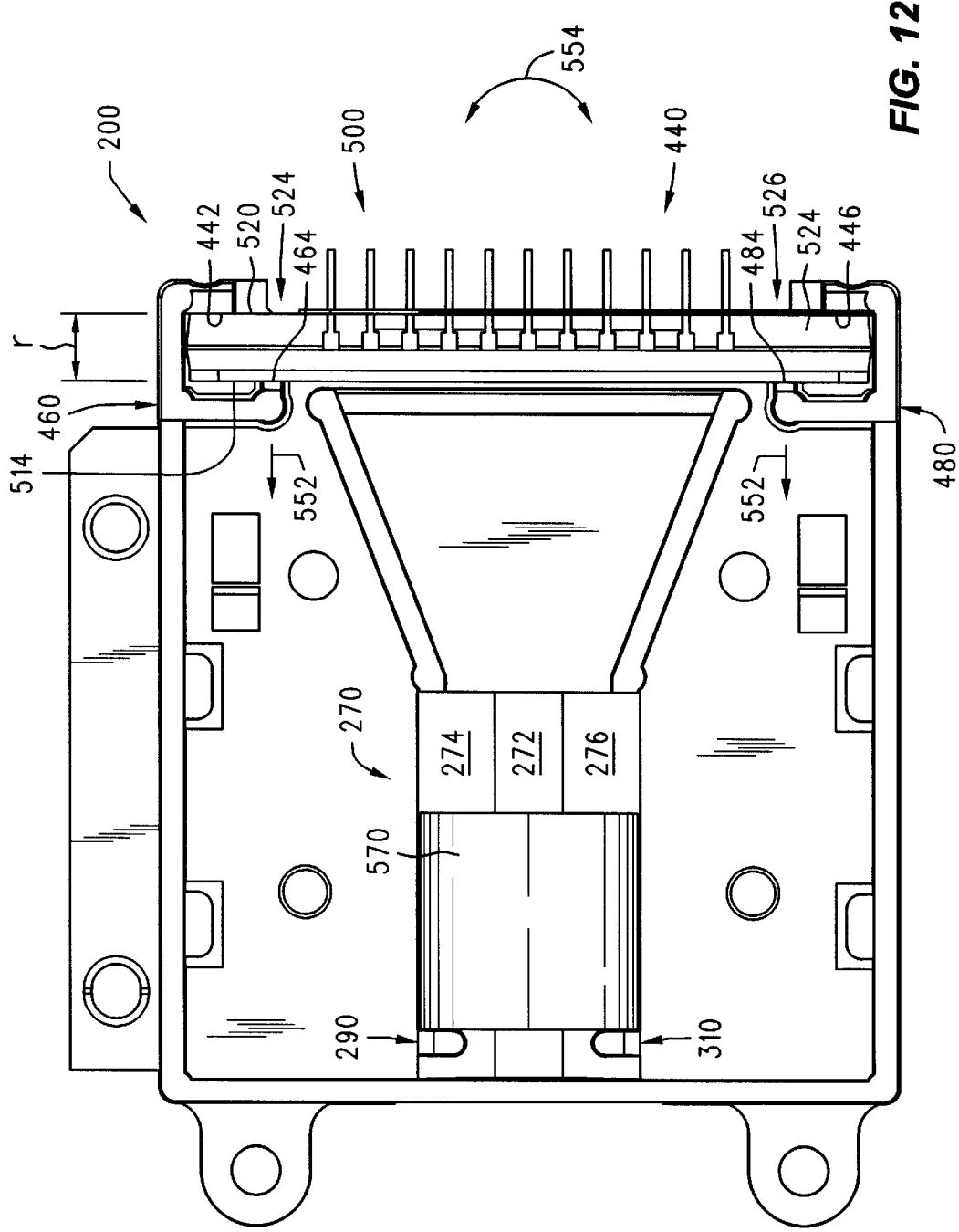
FIG. 12 is a top plan view of the imaging device housing of FIG. 2 showing the installation of a lens and the photosensor assembly of FIG. 4, with its substrate removed for illustration purposes.

FIG. 12 illustrates the photosensor assembly 500 mounted within the photosensor mounting area 440 of the housing 200. To install the photosensor assembly 500 within the mounting area 440, the photosensor package 510 may be pushed down into the mounting area 440, in the direction indicated by the arrow 550 in FIG. 5. As previously described, the distance "i", FIG. 2, may be chosen to be slightly smaller than the thickness "r" of the photosensor package 510. An interference fit, thus, exists between the photosensor package 510 and the mounting area 440. Because of this interference fit, the biasing members 460, 480 will deflect in the direction indicated by the arrows 552, FIG. 12, as the package 510 is pushed into the mounting area 440. The housing tapered portions 444, 448 and the biasing member tapered portions 466, 486, e.g., FIG. 2, facilitate the insertion of the package 510 into the mounting area 440 and the deflection of the biasing members 460, 480, as described above.

As can be appreciated, when the photosensor package 510 is fully inserted within the mounting area 440, as illustrated in FIG. 12, the deflected biasing members 460, 480 will apply a spring force to the package 510 in the opposite direction of the arrows 552. The rear surface 520 of the photosensor assembly 500, in the area of the end 526, will be in contact with the upper rear reference surface 442 of the housing 200. In a similar manner, the rear surface 520 of the photosensor assembly 500, in the area of the end 524, will be in contact with the lower rear reference surface 446 of the housing 200. The front surface 514 of the photosensor assembly 500, in the area of the end 526, will be in contact with the upper biasing member surface 464. In a similar manner, the front surface 520 of the photosensor package 510, in the area of the end 524, will be in contact with the lower biasing member surface 484 of the housing 200. The photosensor rear surface 520, thus, may be securely and forcibly maintained in contact with the upper and lower housing reference surfaces 442, 446 due to spring force applied by the upper and lower biasing members 460, 480.

Referring to FIG. 12, the bottom surface 518, FIG. 10, of the photosensor package 510, in the area of the end 526, will be in contact with the upper right reference surface 450, FIG. 2, of the housing photosensor mounting area 440. In a similar manner, the bottom surface 18 of the photosensor package 510, in the area of the end 524, will be in contact with the lower right reference surface 452 of the housing photosensor mounting area 440. When the housing 200 is installed within the recess 82, FIG. 3, of the sidewall 46, in a manner as will be described in further detail herein, the crush bumps 140, 144 of the recess 82 will forcibly contact the bottom surface 518 of the photosensor package 510. This contact ensures and maintains tight contact between the photosensor package 510 and the housing lower reference surfaces 450, 452.

As can be appreciated, when the photosensor package 510 is installed within the housing 200 in a manner as described above, contact between the photosensor package 510 and the housing rear reference surfaces 442, 446 will prevent the photosensor package 510 from moving relative to the housing 200 in the directions indicated by the arrow 554 in FIG. 12. In a similar manner, contact between the photosensor package 510 and the housing right reference surfaces 450, 452 will prevent the photosensor package 510 from moving relative to the housing 200 in the directions indicated by the arrow 556 in FIG. 4. Finally, the contact between the photosensor package 510 and the housing rear reference surfaces 442, 446 and the contact between the photosensor package 510 and the housing right reference surfaces 450, 452 together will prevent the photosensor package 510 from moving relative to the housing 200 in the directions indicated by the arrow 558 in FIG. 5.

As can further be appreciated, because the photosensor assembly substrate 540 has a length "q", FIG. 10, that is smaller than the length "p" of the photosensor package 510, the exposed end portions 524, 526 of the photosensor package 510 may be referenced directly to the housing 200.

As previously discussed, it is difficult to accurately locate a photosensor package on its underlying circuit board. Because the photosensor package 510 is referenced directly to the housing 200, however, alignment between the photosensor package 510 and the substrate 540 is not critical to the alignment of the photosensor package 510 relative to the housing 200. Accordingly, there is no need to align the photosensor package 510 after it is installed within the housing 200.

The photosensor package 510 may, thus, be accurately located and oriented within the housing 200. Referring to FIG. 12, the lens 570 of the imaging device 60 may be also located and oriented within the housing 200 by the reference surfaces 274, 276, as will be described in further detail herein. Accordingly, the photosensor package 510, mounted as described above, will be accurately referenced with respect to the lens 570.

FIGS. 13–18 illustrate a lens retention clip member 600. As will be described in further detail herein, clip member 600 serves to retain the lens 570 within the lens locating mechanism 270 of the housing 200. Clip member 600 also allows the focus of the imaging device 60 to be adjusted by translating the lens 570 in the directions 724, 726, FIGS. 19 and 20. After the focus is adjusted, the lens clip may then be locked in place such that the lens 570 may no longer be translated and the focus of the imaging device 60 is set.

Figure 13:
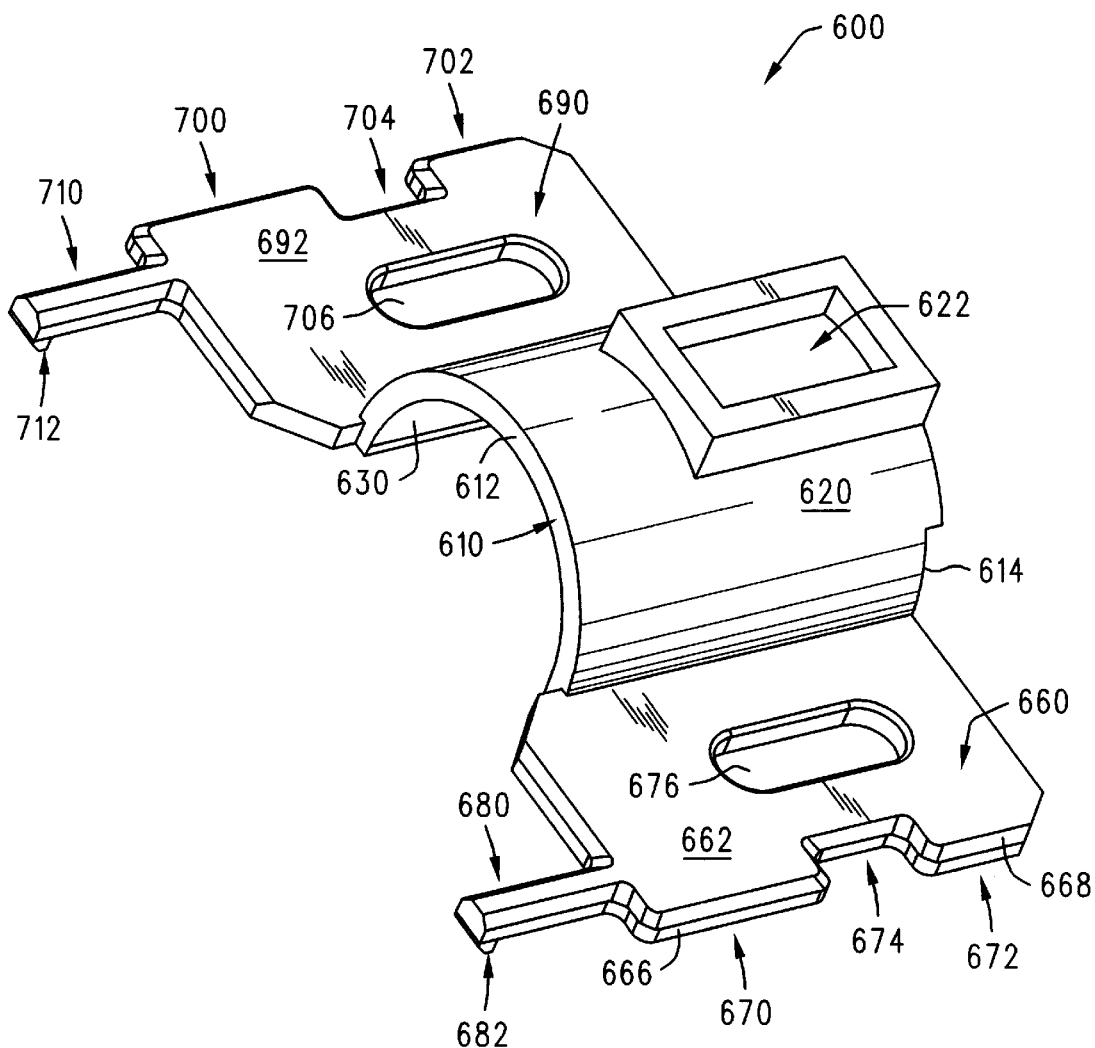
FIG. 13 is a top perspective view of a lens clip usable in conjunction with the imaging device housing of FIG. 2.
Figure 14:
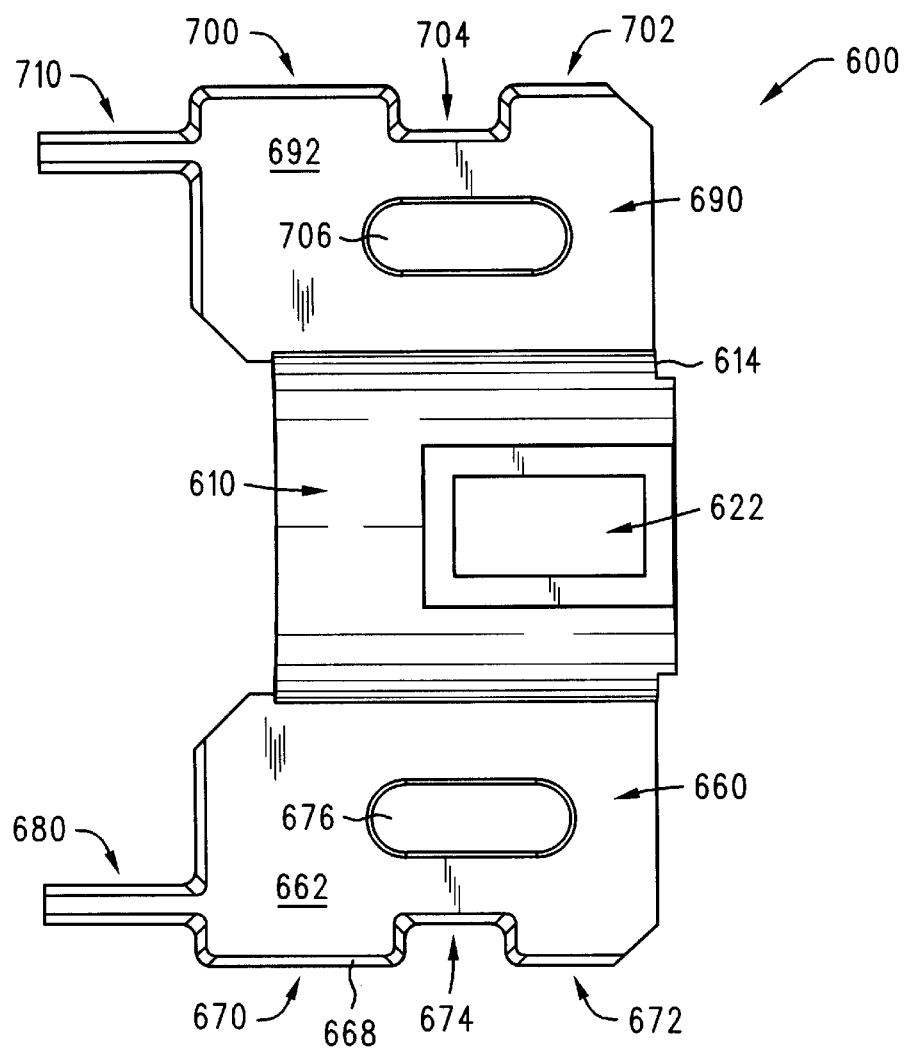
FIG. 14 is a top plan view of the lens clip of FIG. 13.
Figure 15:
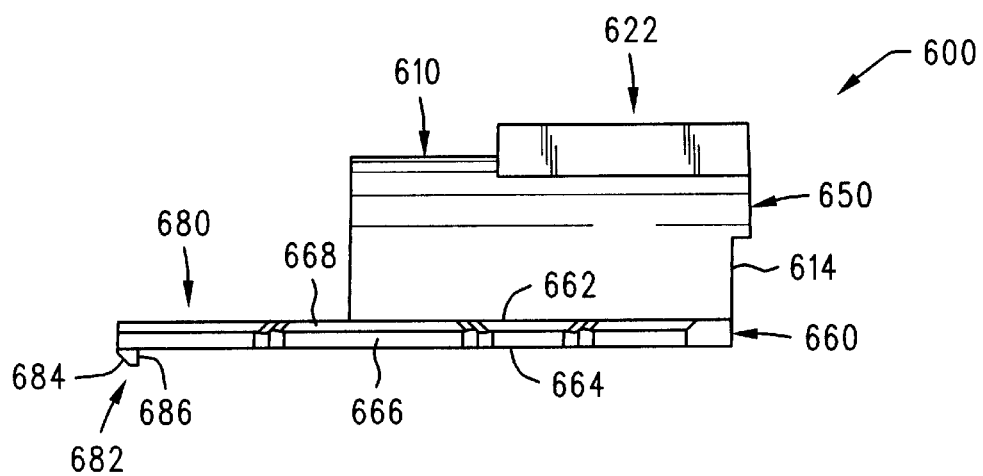
FIG. 15 is side elevation view of the lens clip of FIG. 13, viewed from the right side thereof.

Referring to FIG. 13, clip member 600 may include an arcuate body portion 610 having an upper surface 620 and an oppositely disposed lower surface 630. Arcuate body portion 610 may also include a front surface 612 and a rear surface 614 extending between the upper and lower surfaces 620, 630 in a substantially perpendicular manner with respect thereto. A contact mechanism 622 may be formed on the upper surface 620 as shown.

Figure 16:
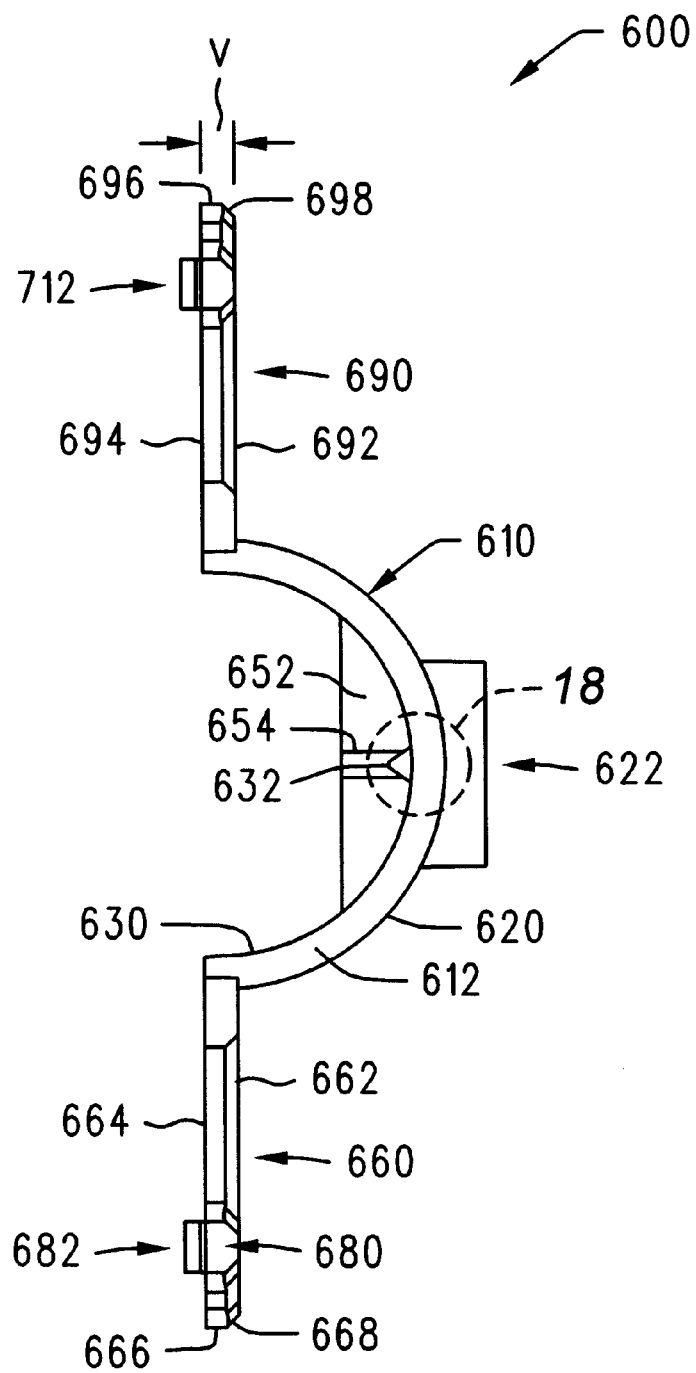
FIG. 16 is front elevation view of the lens clip of FIG. 13.
Figure 17:
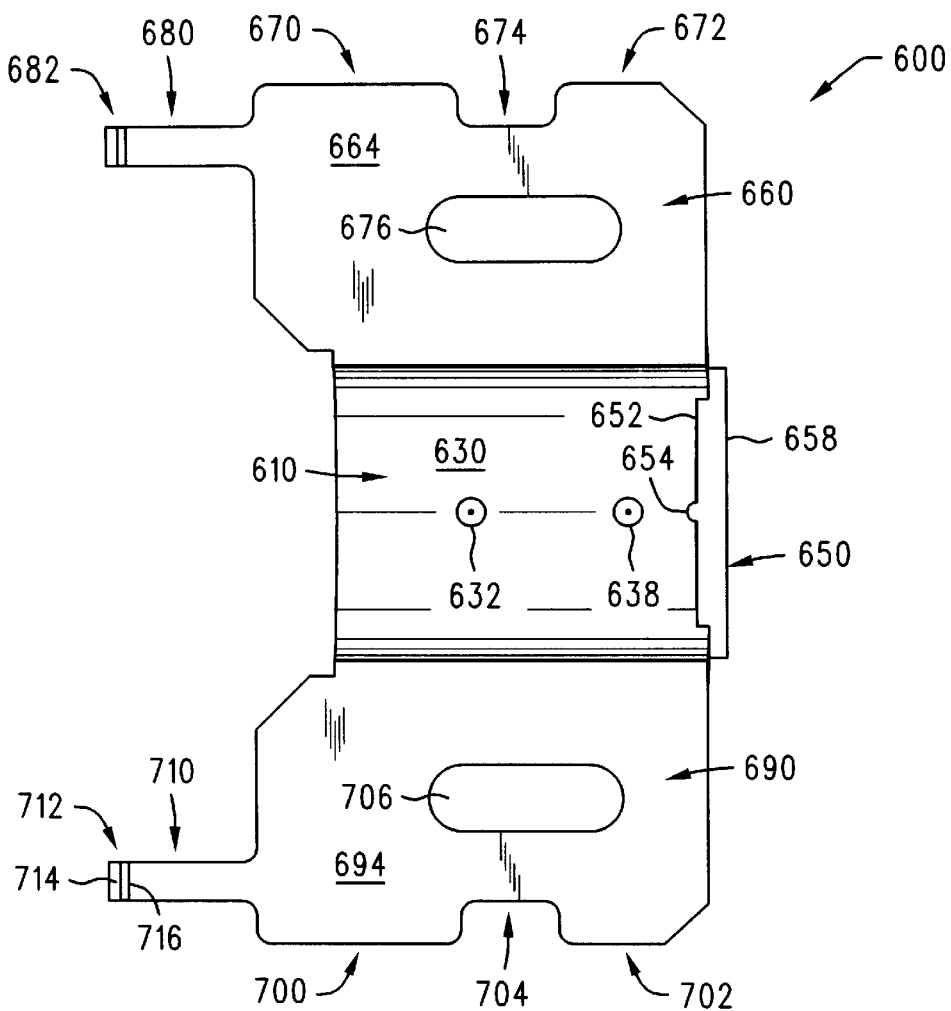
FIG. 17 is a bottom plan view of the lens clip of FIG. 13.
Figure 18:
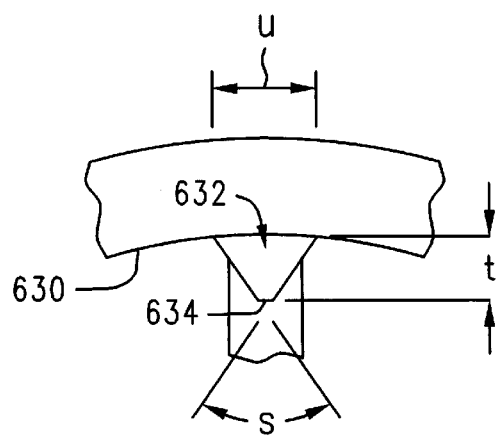
FIG. 18 is a detail view of a portion of the lens clip of FIG. 16.

Referring, for example, to FIGS. 16 and 17, a pair of crush bumps 632, 638 may extend downwardly from the surface 630. Referring to FIG. 18, the crush bump 632 may be formed substantially in the shape of a truncated cone, having a flat bottom surface 634. Crush bump 632 may be formed having an included angle "s" of about 70 degrees. Crush bump 632 may extend for a distance "t" of about 0.9 mm from the lower surface 630 and may have a width "u" of about 1.3 mm at its base. Crush bump 638 may be formed in a substantially identical manner to the crush bump 632, as described above.

With reference to FIGS. 16 and 17, body portion 610 may further include a rear wall member 650 which may be integrally formed with a portion of the body portion rear surface 614. Rear wall member 650 may include a front surface 652 and an oppositely disposed rear surface 658. A contact ridge 654 may be formed on the front surface 652 of the rear wall member 650 as shown.

Referring again to FIG. 13, clip member 600 may include a pair of wing members 660, 690 extending outwardly from the body portion 610, as shown. The wing member 660 may have an upper surface 662 and an oppositely disposed lower surface 664, e.g., FIG. 17. A side surface 666 may extend upwardly from the lower surface 664 in a substantially perpendicular manner with respect thereto. A beveled surface 668 may extend between the side surface 666 and the upper surface 662 as shown. Beveled surface 668 may, for example, extend at an angle of about 45 degrees with respect to the side surface 666. A front flange 670 and a rear flange 672 may be formed in the wing member 660 as shown. The flanges 670, 672 may be spaced from one another, thus forming a notch 674 therebetween. A slotted opening 676 may be formed in the wing member 660, as shown, and may extend between the upper and lower surfaces 662, 664 of the wing member. A finger member 680 may extend forwardly from the wing member 660 as shown. Referring, e.g., to FIG. 15, finger member 680 may include a downwardly extending latch member 682. Latch member 682, in turn, may include a tapered surface 684 and a vertical surface 686 which may be substantially perpendicular to the lower surface 664 of the wing member 662.

The wing member 690 may be formed in a substantially identical manner to the wing member 660. Specifically, wing member 690 may have an upper surface 692 and an oppositely disposed lower surface 694, e.g., FIG. 17. A side surface 696 may extend upwardly from the lower surface 694 in a substantially perpendicular manner with respect thereto, FIG. 16. A beveled surface 698 may extend between the side surface 696 and the upper surface 692 as shown. Beveled surface 698 may, for example, extend at an angle of about 45 degrees with respect to the side surface 696. A front flange 700 and a rear flange 702 may be formed in the wing member 690 as shown. The flanges 700, 702 may be spaced from one another, thus forming a notch 704 therebetween. A slotted opening 706 may be formed in the wing member 690, as shown, and may extend between the upper and lower surfaces 692, 694 of the wing member. A finger member 710 may extend forwardly from the wing member 690 as shown. The finger member 710 may include a downwardly extending latch member 712. Latch member 712, in turn, may include a tapered surface 714 and a vertical surface 716 which may be substantially perpendicular to the lower surface 694 of the wing member 690, FIG. 17. Referring to FIG. 16, each of the wing members 660, 690 may have a thickness "v" of about 1.3 mm.

As described previously, the clip member 600 serves a retention function by retaining the lens 570 within the lens locating mechanism 270 of the housing 200 while allowing the focus of the imaging device 60 to be adjusted by translating the lens. The clip member 600 further serves a locking function. Specifically, after the focus is adjusted, the clip member 600 may be locked in place such that the lens 570 may no longer be translated and the focus of the imaging device 60 is set. The installation and operation of the clip member 600 will now be described in detail.

Referring to FIG. 12, the lens 570 may be inserted into the lens locating mechanism 270, as shown. Specifically, the lens 570 may be inserted such that it rests on the surfaces 274, 276 and it is against the rearwardly facing surfaces 294, 314 of the stop members 290, 310. Next, a spring 720, FIG. 19, may be compressed and inserted between the lens 570 and the rear surface 282 of the lens locating mechanism 270, e.g., FIG. 2. The spring 720 may also contact the forwardly facing surfaces 332, 342 of the wall members 330, 340.

Figure 19:
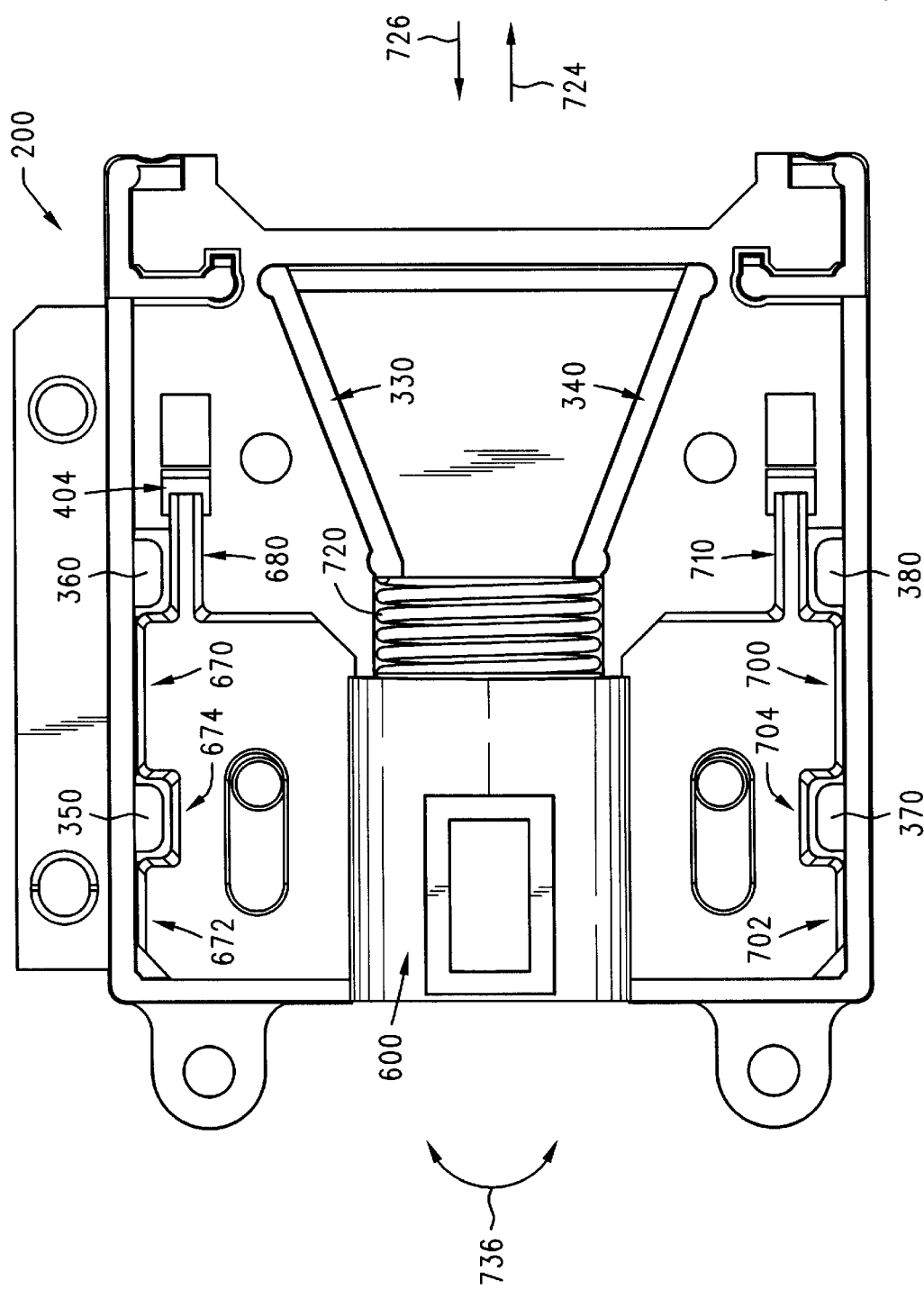
FIG. 19 is a top plan view of the housing of FIG. 2 with a lens, a spring member, and the lens clip of FIG. 13 inserted in a non-retained condition.

Next, the clip member 600 may be inserted into the housing 200 by moving the clip member 600 in the direction 722, FIG. 4, relative to the housing 200. FIG. 19 illustrates the clip member 600 after it has been inserted into the housing 200. As can be appreciated from FIG. 19, when inserted in this manner, the housing tab 350 will be located within the clip member notch 674 and the clip member front flange 670 will be located between the housing tabs 350, 360. In a similar manner, the housing tab 370 will be located within the clip member notch 704 and the clip member front flange 700 will be located between the housing tabs 370, 380.

As can be appreciated, the housing stop members 290, 310 will prevent the spring 570 from forcing the lens 720 against the inner surface 210 of the housing front wall member 208. A space, thus, is maintained between the lens 570 and the inner surface 210. Clip member rear wall member 650, FIG. 17, will be located within this space when it is first inserted into the housing 200, as shown in FIG. 19. The latch members 682, 712, FIG. 17, of the clip finger members 680, 710 will be located within the forward compartments of the housing catch mechanisms 390, 410. The latch member 682, for example, will be located within the forward compartment 404 of the catch mechanism 390.

Figure 20:
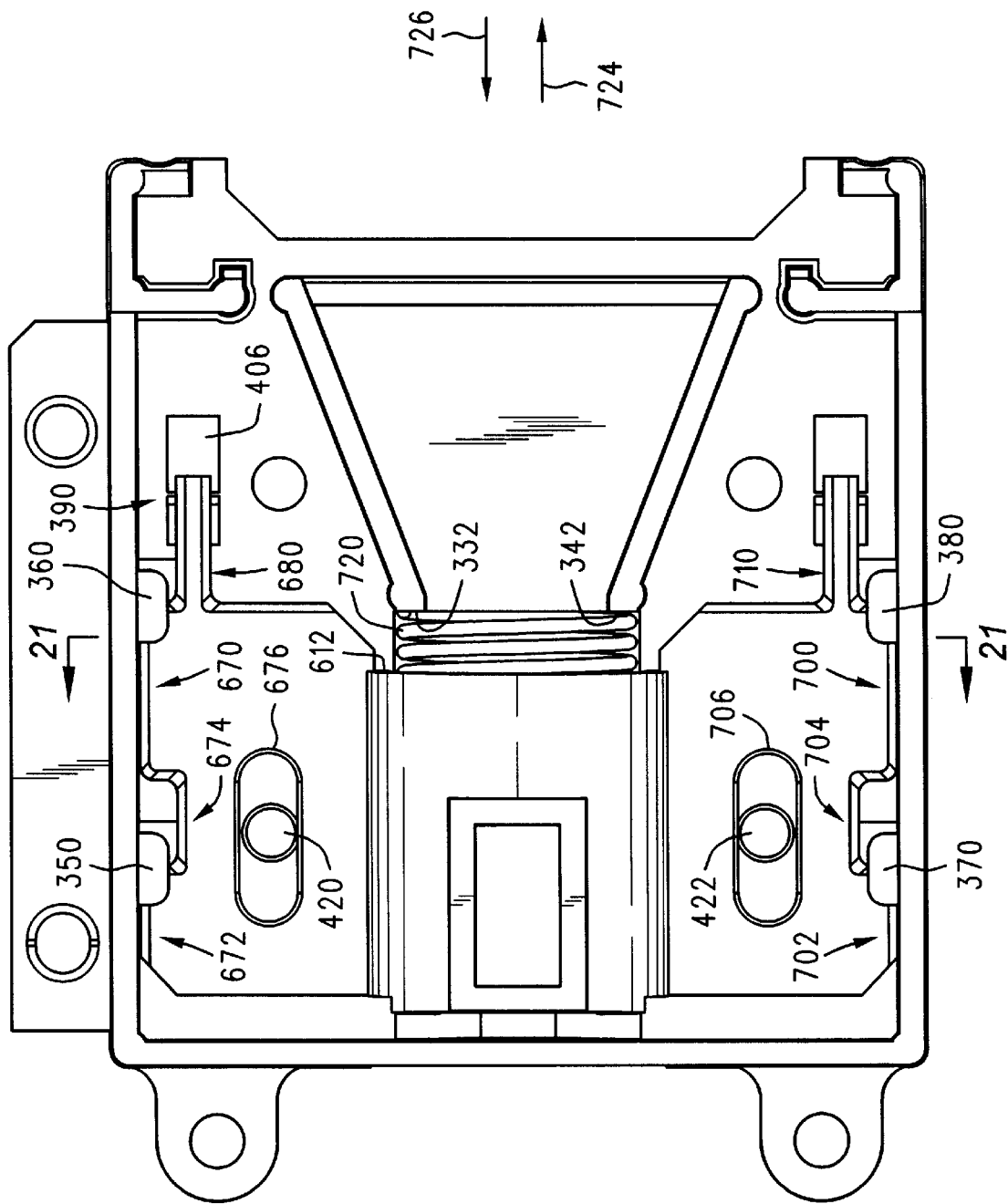
FIG. 20 is a top plan view of the assembly shown in FIG. 19 with the lens clip in a retained condition.

Next the clip 600 may be moved to a retained position, as shown in FIG. 20. To move the clip 600 to this retained position, the clip 600 may be moved in the direction 724, FIGS. 19 and 20, relative to the housing 200, until the latch members 682, 712, FIG. 17, of the clip finger members 680, 710 move over the catch members and into the rearward compartments of the housing catch mechanisms 390, 410. As shown in FIG. 20, for example, the latch member 682 of the clip finger member 680 has moved over the catch member 398 and into the rearward compartment 406 of the housing catch mechanism 390. As can be appreciated, the clip latch member beveled surfaces, e.g., the beveled surface 684, FIG. 15, cooperate with the housing catch member tapered surfaces, e.g., the tapered surface 402, FIG. 8, to allow the clip member to easily be moved in this manner. After the movement is complete, however, the interaction between the clip latch member vertical surfaces, e.g., the vertical surface 686, FIG. 15, and the housing catch member rearwardly facing surfaces, e.g., the rearwardly facing surface 400, FIG. 8, serves to prevent the clip from moving back in the direction 726.

Referring again to FIG. 20, the clip front flanges 670, 700 have moved beneath the housing tabs 360, 380 and the clip rear flanges 672, 702 have moved beneath the housing tabs 350, 370, respectively. The beveled surfaces 668, 698 on the clip wing members 660, 690 facilitate this movement of the flanges 670, 672, 700, 702 beneath the housing tabs 350, 360, 370 380, as described above. The clip member 600 is, thus, now restrained from movement in the direction 723, FIG. 4, relative to the housing 200. Further, in the position shown in FIG. 20, the clip contact ridge 654, FIG. 16, will be in contact with the lens 570 and the spring 720 will be slightly compressed. As can be appreciated, once moved to the position shown in FIG. 20, the clip is fully retained within the housing 200.

Although fully retained within the housing 200, as described above, the clip 600 is still moveable with respect to the housing 200 in the directions 724, 726, FIG. 20. Specifically, the clip 600 may move in the direction 724, against the bias of the spring 720, until the clip front surface 612 contacts the housing forwardly facing surfaces 332, 342. The clip 600 may move in the direction 726 until the position illustrated in FIG. 20 is reached, i.e., until the vertical surfaces of the clip latch members 682, 712, FIG. 13, contact the rearwardly facing surfaces of the housing catch mechanisms 390, 410, FIG. 2. As can be appreciated, this movement of the clip 600 will cause a corresponding movement of the lens 570. The focus of the lens 570 with respect to the photosensor assembly 500, FIG. 12, thus, may be adjusted simply by moving the clip 600 in the directions 724, 726, as described above.

Figure 21:
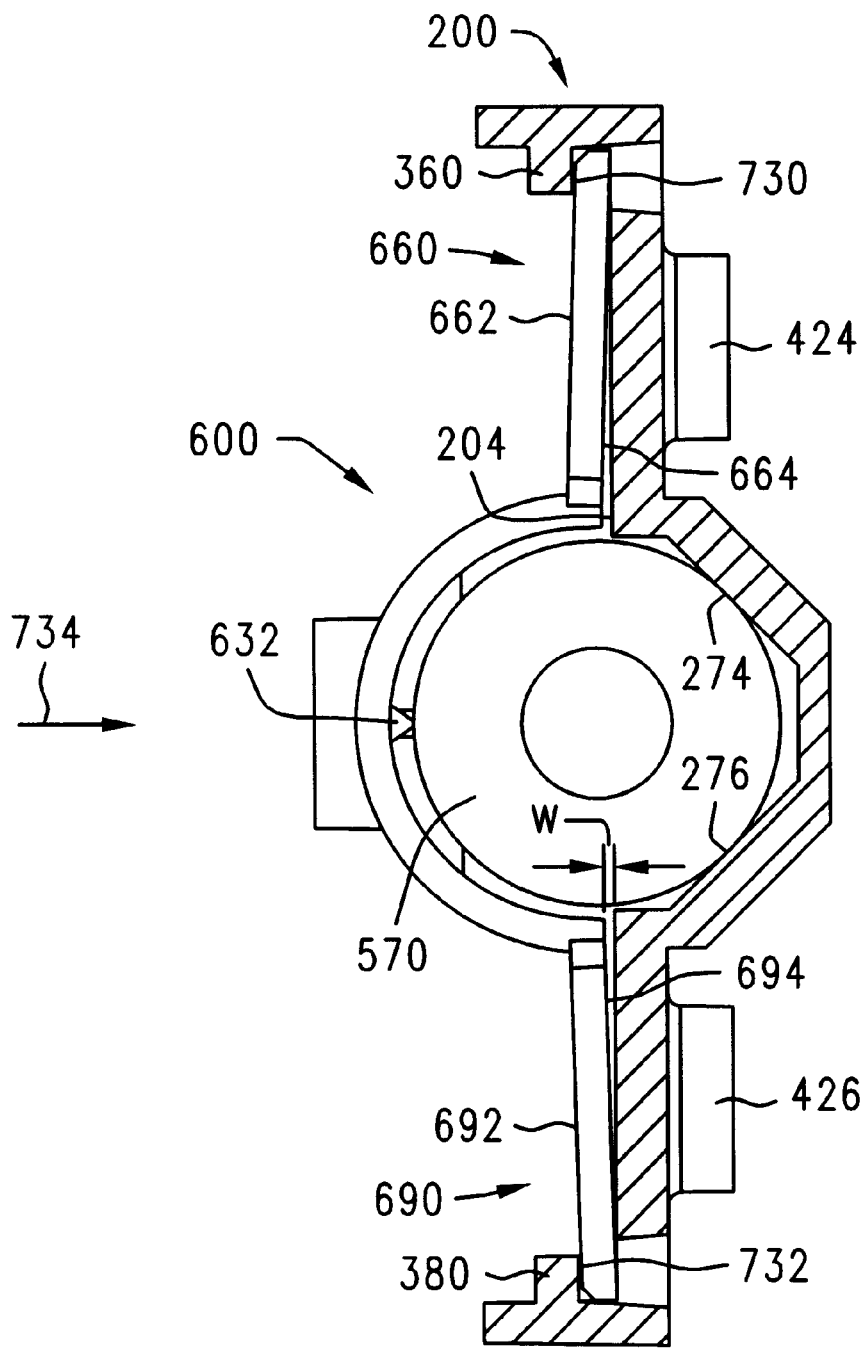
FIG. 21 is a simplified schematic cross-sectional view taken along the line 21—21 in FIG. 20.

As can be appreciated, when adjusting the focus of the lens 570, it is important that the lens 570 remain aligned with the housing 200 and, thus, the photosensor assembly 500. To ensure that this alignment is maintained, downward force is applied by the clip 600 to the lens 570 in order to maintain the lens 570 in tight contact with the surfaces 274, 276 of the lens locating mechanism 270. Referring to FIG. 21, it can be seen that the clip member 600, when retained within the housing 200 as described above, will contact the lens 570 only via the crush bumps 632, 638. The existence of the crush bumps causes the clip 600 to deflect slightly, causing the upper surfaces 662, 692 of the clip member 600 to contact the lower surfaces of the housing tabs 360, 380 at the points 730, 732, respectively. This clip deflection results in a gap "w" of about 0.40 mm between the lower surfaces 664, 694 of the clip member wings 660, 690 and the inner surface 204 of the housing right sidewall member 202. As can be appreciated the clip 600, as illustrated in FIG. 21, is in a configuration known as a pinned-pinnned configuration. In other words, the ends of the clip 600 are restrained from vertical (as viewed in FIG. 21) movement, but are permitted to rotate.

The deflection in the clip 600, as described above, causes the clip to apply a restorative force in the direction of the arrow 734 to the lens 570, thus forcing the lens 570 into tight contact with the surfaces 274, 276. The magnitude of this restorative force may, for example, be about 1.0 lb. Accordingly, as the lens clip is translated in the directions 724, 726, the lens 570 is maintained in tight contact with the surfaces 274, 276 and, thus, in proper alignment with the housing 200 and the photosensor assembly 500.

It is noted that force in the directions 724, 726 may be transferred between the lens clip 600 and the lens 570 only via the contact ridge 654 of the lens clip 600. The provision of the contact ridge 6S4 causes substantially line contact to exist between the lens 570 and the clip 600 and, thus, prevents rotational forces (i.e., in the directions indicated by the arrow 736 in FIG. 19) from being transferred from the clip 600 to the lens 600. Thus, even if a slight rotation is imparted to the clip 600 during the focusing operation, this rotation will not be transferred to the lens 570. This is advantageous since such rotation of the lens 570 might tend to unseat the lens 570 from the surfaces 274, 276 and, thus, result in misalignment of the lens with respect to the housing 200 and photosensor assembly 500.

Figure 22:
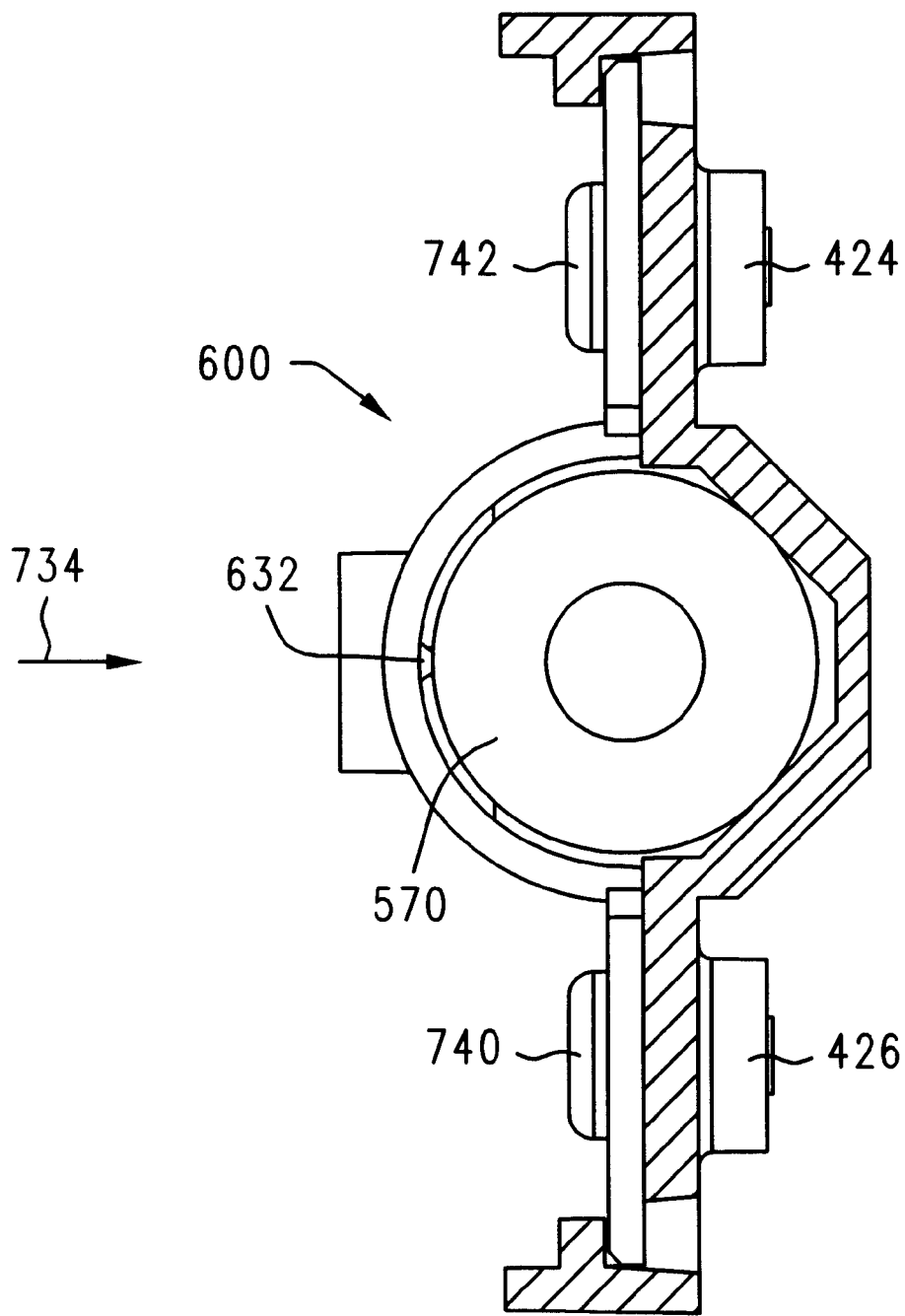
FIG. 22 is a view similar to FIG. 21, but showing the lens clip in its locked down condition.

After the desired focus of the lens 570 has been achieved, the clip 600 may be locked in place to prevent further translation of the clip 600 and lens 570, as will now be described in detail. FIG. 22 illustrates the clip 600 after it has been locked in place. Specifically, a pair of connectors 740, 742 may be passed through the slots 676, 706 of the clip 600 and engaged within the housing through-holes 420, 424, e.g., FIG. 20. Connectors 740, 742 may, for example, be of the type commercially available from Avdell Cherry Textron of 614 Highway 200, South, Stanfield, N.C. and sold as "Rivscrew" Model No. 1712-3009. Although this type of connector has threads, it may be inserted in the manner of a rivet, i.e., without the application of torque. This is advantageous in that applying torque to the connectors during installation might tend to interfere with the focus and/or alignment of the system. Because this type of connector has threads, however, it may easily be removed after installation if, for example, it becomes necessary to reset the focus or otherwise rework the part. It is to be understood that, although the specific type of connector described above is preferable, other types of connectors may also readily be used. One example of another type of connector is a standard rivet.

As can be appreciated with reference to FIG. 22, the connectors 740, 742 force the lower surfaces 664, 694 of the clip member wings 660, 690 tightly against the surface 204 of the housing right sidewall member 202. As can be appreciated the clip 600, as illustrated in FIG. 22, is now in a configuration known as a fixed-fixed configuration. In other words, the ends of the clip 600 are now prevented from rotating in addition to being restrained from vertical (as viewed in FIG. 22) movement. As can further be appreciated, the connectors 740, 742 will cause the gap "w", FIG. 21, to be eliminated. As a result, the crush bumps 632, 638 will be partially crushed. Specifically, the height "t", FIG. 18, of the crush bumps may be reduced by an amount substantially equal to the distance "w", FIG. 21. The shape and size of the initial, uncrushed crush bumps 632, 638 may be chosen such that the force required to crush the crush bumps the distance "w" will be equal to the desired locking force applied by the clip 600 to the lens 570 in the direction 734.

As can be appreciated, after the connectors 740, 742 have been installed, as shown in FIG. 22, the force applied to the lens 570 by the clip 600 will be substantially higher, and will prevent the clip and lens from moving further in the directions 724, 726. The lens clip 600 may, thus, be effectively locked in place by installing the connectors 740, 742. In the locked-down configuration illustrated in FIG. 22, the lens clip 600 may exert a force of about 10.0 lbs. on the lens 570 in the direction 734.

As can be appreciated from the above, the force applied in the retention step (e.g., FIG. 21) and the force applied in the lockdown step (e.g., FIG. 22) are preset by the geometry of the clip 600, housing 200 and lens 570 and are not dependent, e.g., upon torque applied to a screw or other connection member. This results in consistent and repeatable forces being applied and minimizes the effects of human error during assembly.

The structure and operation described above are extremely advantageous, for example, because they enable the lens to be retained within the housing 200, as illustrated in FIG. 20, without the need for tools. The lens may then later be focused and locked down. Further, this subsequent focus/lockdown step may be carried out in a different location from that where the initial lens installation and retention steps are performed. This is advantageous from a manufacturing standpoint in that the installation and lens retention steps generally require less skilled labor than do the focus and lockdown steps.

As will be described in further detail, the lens 570 may actually be installed and retained within the housing 200 and the housing 200 assembled to the media handling device 40, FIG. 1, before the focus is set.

As described previously, the housing 200 and the left sidewall 46, together, form a two-part enclosure for the imaging device 60. Having described the housing 200 and left sidewall 46 in detail, the manner in which the housing 200 mounts to the sidewall 46 will now be described.

Figure 23:
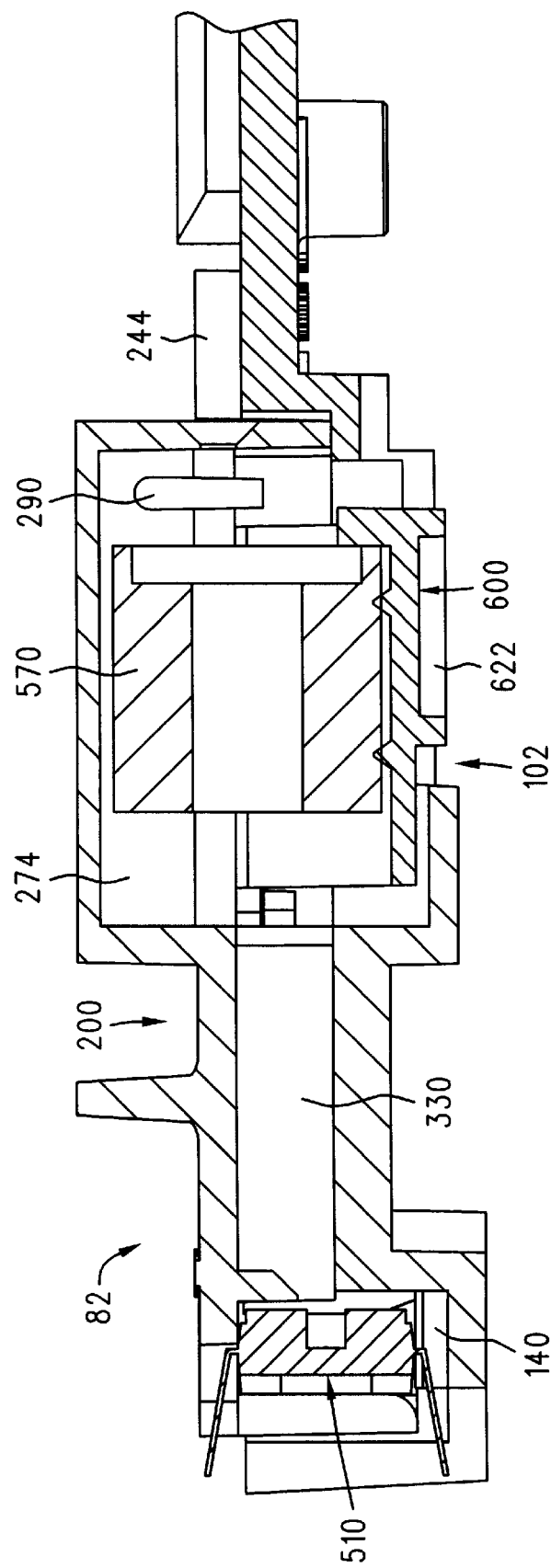
FIG. 23 is a cross-sectional view similar to FIG. 9 but showing the housing of FIG. 2, along with the lens clip of FIG. 13 attached to the media device sidewall portion of FIG. 3.

FIG. 23 is a view similar to FIG. 9, except that FIG. 23 illustrates the housing 200, including the lens clip 600, assembled to the left sidewall 46 of the media handling device 40. It is noted that the substrate 540, e.g., FIG. 10, is omitted from FIG. 23 to facilitate illustration. Referring to FIG. 23, the housing 200 may nest within the recess 82 of the left sidewall 46 such that the housing outer surfaces 212, 220, 228, FIG. 2, are adjacent the recess sidewalls 88, 86, 90, respectively. The housing leg portions 462, 482 are located adjacent the recess indentations 164, 166, respectively and the top surface 522, FIGS. 10 and 11, of the photosensor package 510 will abut recess crush bumps 140, 144.

The housing wall members 330, 340, FIG. 2, will nest within the recess wall members 110, 112. This nesting prevents extraneous light from reaching the photosensor package 510 and, further, provides a tortuous path to prevent dust from reaching the vicinity of the photosensor package 510. The housing surfaces 241, 252 and 245, FIG. 2, will be in contact with the surface 80 of the wall member 46 when the housing 200 is installed within the wall member recess 82 as illustrated in FIG. 23.

A pair of connectors, e.g., screws, may extend through the housing through-holes 428, 429, FIG. 2 and engage within the recess holes 126, 122, respectively, FIG. 3, in order to secure the housing 200 to the sidewall 46. Another pair of connectors may extend through the housing holes 242, 246, FIG. 2, and engage within the recess holes 154, 156, respectively, FIG. 3, to further secure the housing 200 to the sidewall 46. The pins 150, 152 on the sidewall 46, FIGS. 3 and 9, may engage within the housing holes 258, 256, respectively in order to locate the housing 200 relative to the sidewall 46 prior to engaging the connectors as described above.

As can be appreciated, when the housing 200 is installed within the sidewall recess 82, as described above, light may enter the housing 200 via the housing opening 260, FIG. 5. Thereafter, the light may be focused onto the photosensor package 510 by the lens 570. Between the lens 570 and the photosensor package 510, the light will pass between the housing walls 330, 340, FIG. 2.

Referring again to FIG. 23, with the housing 200 installed as described above, the contact mechanism 622 will extend through the left sidewall opening 102. Further, the sidewall holes 130, 132, FIG. 3, will be adjacent the housing holes 420, 424, respectively, FIG. 2. Accordingly, both the contact mechanism 622 and the holes 420, 424 will remain accessible after the housing 200 is attached to the sidewall 46. The contact mechanism and the holes, in fact, will be accessible even after the wall member 46 is assembled to the remainder of the media handling device 40. Accordingly, the focus of the lens 570 may be adjusted and then locked down, in a manner as previously described, even after the media handling device 40 is completely assembled. To accomplish this, a conventional automated or manual adjustment device may be used to contact the contact mechanism 622 and adjust the focus of the lens 570. Thereafter, the connectors 740, 742, FIG. 22, may be installed to lock the lens 570 in place. Once again, the connectors 740, 742 may be installed either manually or by an automated adjustment assembly.

The use of the spring 720, as described above, is advantageous in that an automated or manual adjustment device used to set the focus of the lens 570 only need apply force to the lens clip 600 in one direction, i.e. the direction 724 in FIG. 20. The lens 570, along with the lens clip 600, will be moved in the opposite direction, i.e., the direction 726, FIG. 20, due to the restorative force supplied by the spring 720. Because it is only necessary to supply force in one direction, the automated or manual adjustment device need only push against the contact mechanism 622 of the lens clip 600 and does not need to grasp the lens clip 600. It has been found that such grasping by an automated or manual adjustment device sometimes tends to apply a rotational force to the lens and, thus, cause misalignment of the lens during focusing.

The spring 720 also causes the initial position of the lens clip 600, FIG. 20, to always be the same relative to the housing 200. This consistent positioning, in turn, facilitates adjustment by an automated adjustment device, since the automated adjustment device may always move to the same position, relative to the housing 200, in order to initially contact the lens clip contact mechanism 622.

The housing 200, clip 600, as well as the sidewall 46 may, for example, be formed of a plastic material such as polycarbonate and may be formed in a conventional injection molding process.

It is noted that the foregoing has been described in conjunction with a barcode reader in a media handling device for purposes of illustration only. The apparatus and methods described herein could alternatively be used in a barcode reader in any application, such as a fixed barcode reader on an assembly line or a hand-held barcode scanner. They could also be used in imaging systems other than barcode readers. Examples include optical scanning devices, photocopiers and telefax machines.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An imaging apparatus for producing machine-readable data representative of an imaged object, said imaging apparatus comprising:
   (a) an imaging apparatus housing, said imaging apparatus housing including at least one imaging apparatus housing first reference surface and at least one imaging apparatus housing second reference surface;
   (b) a photosensor assembly, said photosensor assembly including:
      a plurality of photosensor elements;
      a photosensor housing substantially enclosing said plurality of photosensor elements, said photosensor housing including at least one photosensor housing first reference surface;
   (c) at least one optical component located within said imaging apparatus housing;
   wherein said at least one photosensor housing first reference surface is in contact with said at least one imaging apparatus housing first reference surface and said at least one optical component is in contact with said at least one imaging apparatus housing second reference surface.

2. The imaging apparatus of claim 1 wherein said photosensor housing further includes a plurality of electrical contact leads in electrical contact with said plurality of photosensor elements, wherein said plurality of electrical contact leads extend outwardly from said photosensor housing.

3. The imaging apparatus of claim 1 wherein said at least one optical component comprises at least one lens.

4. The imaging apparatus of claim 1 wherein said imaging apparatus housing is integrally formed.

5. The imaging apparatus of claim 1 wherein said imaging apparatus housing further includes at least one spring mechanism in contact with said photosensor housing.

6. The imaging apparatus of claim 5 wherein said spring mechanism is integrally formed with said imaging apparatus housing.

7. The imaging apparatus of claim 1 wherein said at least one imaging apparatus housing first reference surface comprises a plurality of imaging apparatus housing first reference surfaces.

8. The imaging apparatus of claim 1 wherein said photosensor housing includes at least one photosensor housing second reference surface and said imaging apparatus housing includes at least one imaging apparatus housing third reference surface in contact with said at least one photosensor housing second reference surface.

9. The imaging device of claim 2 wherein said plurality of electrical contact leads are attached to a substrate.

10. A method of assembling an imaging apparatus for producing machine-readable data representative of an imaged object, said method comprising:
   (a) providing an imaging apparatus housing, said imaging apparatus housing including at least one imaging apparatus housing first reference surface and at least one imaging apparatus housing second reference surface;
   (b) providing a photosensor assembly, said photosensor assembly including:
      a plurality of photosensor elements;
      a photosensor housing substantially enclosing said plurality of photosensor elements, said photosensor housing including at least one photosensor housing first reference surface;
   (c) aligning at least one optical component with said imaging apparatus housing by contacting said at least one optical component with said at least one imaging apparatus housing second reference surface;
   (d) aligning said photosensor housing with said imaging apparatus housing by contacting said at least one photosensor housing first reference surface with said at least one imaging apparatus housing first reference surface.

11. The method of claim 10 wherein said at least one optical component comprises at least one lens.

12. The method of claim 10 and further including maintaining said at least one photosensor housing first reference surface in contact with said at least one imaging apparatus housing first reference surface by applying a force to said photosensor housing.

13. The method of claim 12 wherein said applying a force comprises applying a resilient force to said photosensor housing.

14. The method of claim 13 wherein said imaging apparatus housing further includes at least one spring mechanism and wherein said applying a resilient force comprises applying a resilient force with said spring mechanism.

15. The method of claim 14 wherein said spring mechanism is integrally formed with said imaging apparatus housing.

16. The method of claim 10 wherein said at least one imaging apparatus housing first reference surface comprises a plurality of imaging apparatus housing first reference surfaces.

17. The method of claim 10 wherein said photosensor housing includes at least one photosensor housing second reference surface and said imaging apparatus housing includes at least one imaging apparatus housing third reference surface in contact with said at least one photosensor housing second reference surface.

18. An imaging apparatus for producing machine-readable data representative of an imaged object, said imaging apparatus comprising:
   (a) an imaging apparatus housing
   (b) at least one optical component housed within said imaging apparatus housing;
   (c) a photosensor assembly attached to said imaging apparatus housing, said photosensor assembly having a photosensor assembly axis associated therewith and wherein said photosensor assembly includes:
      a substrate;
      a photosensor housing attached to said substrate;
      a plurality of photosensor elements housed within said photosensor housing;

wherein said photosensor housing has a photosensor housing length measured in a direction parallel to said photosensor assembly axis;

wherein said substrate has a substrate length measured in a direction parallel to said photosensor assembly axis; and wherein said photosensor housing length is greater than said substrate length.

19. The imaging apparatus of claim 18 wherein at least a portion of said photosensor housing is in direct contact with at least a portion of said imaging apparatus housing.

20. The imaging apparatus of claim 18 wherein said photosensor housing further includes a plurality of electrical contact leads in electrical contact with said plurality of photosensor elements and wherein said plurality of electrical contact leads are connected to said substrate.

21. The imaging apparatus of claim 18 wherein said at least one optical component comprises at least one lens.

22. The imaging apparatus of claim 18 wherein said imaging apparatus housing further includes at least one spring mechanism in contact with said photosensor housing.

23. The imaging apparatus of claim 22 wherein said spring mechanism is integrally formed with said imaging apparatus housing.

* * * * *

UNITED STATES PATENT AND TRADEMARK OFFICE
CERTIFICATE OF CORRECTION

PATENT NO.    : 6,265,705 B1  
DATED         : July 24, 2001  
INVENTOR(S)   : Richard Lynn Gardner, Jr.

It is certified that error appears in the above-identified patent and that said Letters Patent is hereby corrected as shown below:

<u>Column 2,</u>
Line 23, delete "mis-alignment" and insert therefor -- misalignment --

<u>Column 3,</u>
Line 23, delete "non critical" and insert therefor -- noncritical --

<u>Column 5, line 64-Column 6, line 27,</u>
Insert -- Media library device 10 may be a conventional media library device and may, for example, be of the type disclosed in the following United States Patent applications: serial number 09/290,842 of Gardner for OPTICAL ASSEMBLY HAVING LENS OFFSET FROM OPTICAL AXIS, filed on April 13, 1999; serial number 09/291,242 of Gardner, et al. for GUIDANCE SYSTEM AND METHOD FOR AN AUTOMATED MEDIA EXCHANGER, filed on April 13, 1999; serial number 09/290,429 of Gardner et al. for IMAGING APPARATUS ALIGNMENT SYSTEM AND METHOD, filed on April 13, 1999; serial number 09/290,807 of Gardner for CALIBRATION SYSTEM FOR AN IMAGING APPARATUS AND METHOD, filed on April 13, 1999, serial number 09/290,428 of Kato et al. for METHOD OF DECIPHERING BAR CODES, filed on April 13, 1999; serial number 09/290,926 of Gardner, et al. for AUTOMATED OPTICAL DETECTION SYSTEM AND METHOD, filed on April 13, 1999, serial number 09/292,781 of Gardner for LOW POWER ILLUMINATOR, filed on April 13, 1999; and patent number 6,118,598 of Gardner for METHOD AND APPARATUS FOR SETTING FOCUS IN AN IMAGING DEVICE, which are all hereby incorporated by reference for all that is disclosed therein. --

Signed and Sealed this

Fourteenth Day of January, 2003

JAMES E. ROGAN  
*Director of the United States Patent and Trademark Office*